US012597430B2

(12) United States Patent
Ravelli et al.

(10) Patent No.: US 12,597,430 B2
(45) Date of Patent: Apr. 7, 2026

(54) MULTI-CHANNEL SIGNAL GENERATOR, AUDIO ENCODER AND RELATED METHODS RELYING ON A MIXING NOISE SIGNAL

(71) Applicant: Fraunhofer-Gesellschaft zur Foerderung der angewandten Forschung e.V., Munich (DE)

(72) Inventors: Emmanuel Ravelli, Erlangen (DE); Jan Frederik Kiene, Erlangen (DE); Guillaume Fuchs, Erlangen (DE); Srikanth Korse, Erlangen (DE); Markus Multrus, Erlangen (DE); Eleni Fotopoulou, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 630 days.

(21) Appl. No.: 18/175,355

(22) Filed: Feb. 27, 2023

(65) Prior Publication Data

US 2023/0206930 A1 Jun. 29, 2023

Related U.S. Application Data

(63) Continuation of application No. PCT/EP2021/068079, filed on Jun. 30, 2021.

(30) Foreign Application Priority Data

Aug. 31, 2020 (EP) .................................... 20193716

(51) Int. Cl.
*G10L 19/008* (2013.01)
*G10L 19/012* (2013.01)
(Continued)

(52) U.S. Cl.
CPC .......... *G10L 19/008* (2013.01); *G10L 19/012* (2013.01); *G10L 21/0264* (2013.01); *G10L 25/78* (2013.01)

(58) Field of Classification Search
CPC . G10L 19/008; G10L 19/012; G10L 21/0264; G10L 19/24; G10L 19/20; G10L 19/032; G10L 25/78
(Continued)

(56) References Cited

U.S. PATENT DOCUMENTS 8,116,486 B2 2/2012 Schnell et al.
8,731,209 B2 5/2014 Uhle et al.
(Continued)

FOREIGN PATENT DOCUMENTS

CN 104050969 A 9/2014
CN 109074810 A 12/2018
(Continued)

OTHER PUBLICATIONS

Z. Wang et al., "Linear prediction based comfort noise generation in the EVS codec," 2015 IEEE International Conference on Acoustics, Speech and Signal Processing (ICASSP), South Brisbane, QLD, Australia, 2015, pp. 5903-5907. (Year: 2015).*
(Continued)

*Primary Examiner* — Richemond Dorvil
*Assistant Examiner* — Rodrigo A Chavez
(74) *Attorney, Agent, or Firm* — Perkins Coie LLP; Michael A. Glenn

(57) ABSTRACT

A signal generator for generating a multichannel signal, having:
- first and a second audio sources, generating first and second audio signals, respectively;
- a mixing noise source, generating a noise signal;
- a mixer, mixing the noise signal and the first audio signal to derive a first channel, and the noise signal and the second audio signal to derive a second channel.

(Continued)

An audio encoder includes:
an activity detector, analyzing a multichannel signal to determine a frame to be an inactive frame;
a noise parameter calculator, calculating first and second parametric noise data for first and second channels, respectively;
a coherence calculator, calculating coherence data indicating coherence between the first and the second channel in the inactive frame; and
an output interface, generating the encoded multichannel audio signal comprising encoded audio data for an active frame and, for the inactive frame, the first and second parametric noise data and the coherence data.

27 Claims, 9 Drawing Sheets

(51) Int. Cl.
*G10L 19/032* (2013.01)
*G10L 19/20* (2013.01)
*G10L 19/24* (2013.01)
*G10L 21/0264* (2013.01)
*G10L 25/78* (2013.01)

(58) Field of Classification Search
USPC .......................................................... 704/500
See application file for complete search history.

(56) References Cited

U.S. PATENT DOCUMENTS

| | | | |
|---|---|---|---|
| 9,583,114 B2 | 2/2017 | Lombard et al. | |
| 2008/0027718 A1 | 1/2008 | Krishnan et al. | |
| 2011/0013790 A1 | 1/2011 | Hilpert et al. | |
| 2015/0222988 A1* | 8/2015 | Sorensen | G10L 21/0208 381/94.1 |
| 2016/0027447 A1* | 1/2016 | Dickins | H04M 3/568 704/228 |
| 2016/0260438 A1 | 9/2016 | Geiger et al. | |
| 2017/0004844 A1 | 1/2017 | Short et al. | |
| 2017/0047072 A1* | 2/2017 | Eriksson | G10L 19/03 |
| 2018/0358024 A1* | 12/2018 | Pobloth | G10L 19/008 |
| 2019/0005969 A1 | 1/2019 | Dick et al. | |
| 2021/0012784 A1 | 1/2021 | Fotopoulou et al. | |
| 2021/0151060 A1* | 5/2021 | Jansson | G10L 19/06 |

FOREIGN PATENT DOCUMENTS

| | | |
|---|---|---|
| JP | 2018515813 A | 6/2018 |
| RU | 2461144 C2 | 9/2012 |
| RU | 2562395 C2 | 9/2015 |
| TW | 1359620 B | 3/2012 |
| TW | 202004734 A | 1/2020 |
| WO | 2019193149 A1 | 10/2019 |
| WO | 2019193156 A1 | 10/2019 |

OTHER PUBLICATIONS

3GPP TS 26.090, "Mandatory Speech Codec speech processingfunctions; Adaptive Multi-Rate (AMR) speech codec; Transcoding functions (Release16)", 3GPP TS 26.090 V16.0.0 (Jul. 2020), Jul. 2020, 56 pp.

3GPP TS 26.190, "Adaptive Multi-Rate—Wideband (AMR-WB) speech codec; Transcoding functions, Release 16", 3GPP TS 26.190 V16.0.0 (Jul. 2020), Jul. 2020, 51 pp.

3GPP TS 26.445, "[Uploaded in 2 parts] Codec for Enhanced Voice Services (EVS); Detailed algorithmic description, Release 16", 3GPP TS 26.445 V16.0.0 (Jun. 2019)—676 pp., Jun. 2019, 317 pp.

ITU-T G.718, "Frame error robust narrow-band and wideband embedded variable bit-rate coding of speech and audio from 8-32 kbit/s", ITU-T G.718 (Jun. 2008), Series G: Transmission Systems and Media, Digital Systems and Networks, Digital terminal equipments—Coding of voice and audio signals, International Telecommunication Union(ITU), Jun. 2008, 257 pp.

ITU-T G.729, "Series G: Transmission Systems and Media, Digital Systems and Networks Digital terminal equipments—Coding of voice and audiosignals", ITU-T G.729 (Jun. 2012) (incl. Annex B—A silence compression scheme for G.729 optimized for terminals conforming to ITU-T Recommendation V.70. International Telecommunication Union (ITU) and ITU-T G.729.1 Annex C DTX/CNG scheme.), Jun. 2012, 152 pp.

Lombard, Anthony, et al., "Frequency-Domain Comfort Noise Generation for Discontinuous Transmission in EVS", Acoustics, Speech and Signal Processing (ICASSP), 2015 IEEE International Conference on IEEE., pp. 5893-5897.

Mirabilii, Daniele, et al., "Simulating Multi-channel Wind Noise Based on the Corcos Model", arxiv.org, Cornell University Library, 201 Olin Library Cornell University Ithaca, NY 14853, (May 24, 2018), doi:10.1109/IWAENC.2018.8521302, XP081555728, 5 pp.

Wang, Zhe, et al., "Linear prediction based comfort noise generation in the EVS codec", IEEE International Conference on Acoustics, Speech and Signal Processing (ICASSP), Brisbane, QLD, 2015, pp. 5903-5907.

Anonymous , "Coherence Function 5-8 G10L Mathematics of the DFT", May 20, 2018 (May 20, 2018), XP093298401, Retrieved from the Internet: URL:https://web.archive.org/web/20180520190041/https://www.dsprelated.com/freebooks/mdft/Coherence_Function.html [retrieved on Jul. 22, 2025].

* cited by examiner

MULTI-CHANNEL SIGNAL GENERATOR, AUDIO ENCODER AND RELATED METHODS RELYING ON A MIXING NOISE SIGNAL

CROSS-REFERENCE TO RELATED APPLICATIONS

This application is a continuation of copending International Application No. PCT/EP2021/068079, filed Jun. 30, 2021, which is incorporated herein by reference in its entirety, and additionally claims priority from European Application No. 20193716.6, filed Aug. 31, 2020, which is also incorporated herein by reference in its entirety.

FIELD OF THE INVENTION

The present invention is related, inter alia, to Comfort Noise Generation (CNG) for enabling Discontinuous Transmission (DTX) in Stereo Codecs. The invention also refers to Multi-Channel Signal Generator, Audio Encoder and Related Methods e.g. Relying on a Mixing Noise Signal. The invention may be implemented in a device, an apparatus, a system, in a method, in a non-transitory storage unit storing instructions which, when executed by a computer (processor, controller) cause the computer (processor, controller) cause to perform a particular method, and in an encoded multi-channel audio signal.

BACKGROUND OF THE INVENTION

Comfort noise generators are usually used in discontinuous transmission (DTX) of audio signals, in particular of audio signals containing speech. In such a mode the audio signal is first classified in active and inactive frames by a voice activity detector (VAD). Based on the VAD result, only the active speech frames are coded and transmitted at the nominal bit-rate. During long pauses, where only the background noise is present, the bit-rate is lowered or zeroed and the background noise is coded parametrically using silence insertion descriptor frames (SID frames). The average bitrate is then significantly reduced.

The noise is generated during the inactive frames at the decoder side by a comfort noise generator (CNG). The size of an SID frame is very limited in practice. Therefore, the number of parameters describing the background noise has to be kept as small as possible. To this aim, the noise estimation is not applied directly on the output of the spectral transforms.

Instead, it is applied at a lower spectral resolution by averaging the input power spectrum among groups of bands, e.g., following the Bark scale. The averaging can be achieved either by arithmetic or geometric means. Unfortunately, the limited number of parameters transmitted in the SID frames does not allow to capture the fine spectral structure of the background noise. Hence only the smooth spectral envelope of the noise can be reproduced by the CNG. When the VAD triggers a CNG frame, the discrepancy between the smooth spectrum of the reconstructed comfort noise and the spectrum of the actual background noise can become very audible at the transitions between active frames (involving regular coding and decoding of a noisy speech portion of the signal) and CNG frames.

Some typical CNG technologies can be found in the ITU-T Recommendations G.729B [1], G.729.1C [2], G.718 [3], or in the 3GPP Specifications for AMR [4] and AMR- WB [5]. All these technologies generate Comfort Noise (CN) by using the analysis/synthesis approach making use of linear prediction (LP).

To further reduce the transmission rate, the 3GPP telecommunications codec for the Enhanced Voice Services (EVS) of LTE [6] is equipped with a Discontinuous Transmission (DTX) mode applying Comfort Noise Generation (CNG) for inactive frames, i.e. frames that are determined to consist of background noise only. For these frames, a low-rate parametric representation of the signal is conveyed by Silence Insertion Descriptor (SID) frames at most every 8 frames (160 ms). This allows the CNG in the decoder to produce an artificial noise signal resembling the actual background noise. In EVS, CNG can be achieved using either a linear predictive scheme (LP-CNG) or a frequency-domain scheme (FD-CNG), depending on the spectral characteristics of the background noise.

The LP-CNG approach in EVS [7] operates on a split-band basis with the coding consisting of both a low-band and a high-band analysis/synthesis encoding stage. In contrast to the low-band encoding, no parameter modeling of the high-band noise spectrum is performed for the high-band signal. Only the energy of high-band signal is encoded and transmitted to the decoder and the high-band noise spectrum is generated purely at the decoder side. Both the low-band and the high-band CN is synthesized by filtering an excitation through a synthesis filter. The low-band excitation is derived from the received low-band excitation energy and the low-band excitation frequency envelope. The low-band synthesis filter is derived from the received LP parameters in the form of line spectral frequency (LSF) coefficients. The high-band excitation is obtained using energy which is extrapolated from the low-band energy and the high-band synthesis filter is derived from a decoder side LSF interpolation. The high-band synthesis is spectrally flipped and added to the low-band synthesis to form the final CN signal.

The FD-CNG approach [8] [9], makes use of a frequency-domain noise estimation algorithm followed by a vector quantization of the background noise's smoothed spectral envelope. The decoded envelope is refined in the decoder by running a second frequency-domain noise estimator. Since a purely parametric representation is used during inactive frames, the noise signal is not available at the decoder in this case. In FD-CNG, noise estimation is performed in every frame (active and inactive) at encoder and decoder sides based on the minimum statistics algorithm.

A method for generating comfort noise in the case of two (or more) channels is described in [10]. In [10], a system for stereo DTX and CNG is described that combines a mono SID with a band-wise coherence measure calculated on the two input stereo channels in the encoder. At the decoder, the mono CNG information and the coherence values are decoded from the bitstream and the target coherence in a number of frequency bands is synthesized. To lower the bitrate of the resulting stereo SID frame, the coherence values are encoded using a predictive scheme followed by an entropy coding with variable bit rate. Comfort noise is generated for each channel with the methods described in the previous paragraphs and then the two CNs are mixed band-wise using a formula with weighting based on transmitted band coherence values included in the SID frame.

In a stereo system, generating the background noise separately leads to completely uncorrelated noise which sounds unpleasant and is very different from the actual background noise causing abrupt audible transitions when we switch to/from active mode background to DTX mode backgrounds. Additionally, it is not possible to preserve the stereo image of the background using only two completely uncorrelated noise sources. Finally, if there is a background noise source and the talker is moving with a handheld device about the source, the spatial image of the background noise will change with time, something that could not be replicated when reconstructing the background noise for each channel independently. Therefore, a new approach to accommodate the problem for stereophonic signals needs to be developed.

This is also addressed in [10], however, in embodiments, the insertion of a common noise source for the two channels to imitate the correlated noise for generating the final comfort noise plays an important role on imitating stereophonic background noise recording.

Current communication speech codecs typically only code mono signals. Therefore, most existing DTX systems are designed for mono CNG. Simply applying DTX operation independently on both channels of a stereo signal seems straightforward but includes several problems. First, this approach necessitates transmission of two sets of parameters describing the two background noise signals in the two channels. This would increase the data rate needed for SID frame transmission which diminishes the benefit of load reduction on the network. Another problematic aspect lies in the VAD decision, which has to be synchronized between the channels to avoid oddities and distortions of the spatial image of the stereo signal and also to optimize bitrate reduction of the system. Moreover, when applying CNG on the receiver side independently on both channels, the two independent CNG algorithms will typically produce two random noise signals with zero or very low coherence. This will result in a very wide stereo image in the generated comfort noise. On the other hand, only applying on noise generator and using the same comfort noise signal in both channels leads to a very high coherence and a very narrow stereo image. For most stereo signals, however, the stereo image and its spatial impression will be somewhere in between these two extremes. Switching to or from active frames to DTX mode would therefore introduce abrupt audible transitions. Also, if there is a background noise source and the talker is moving with a handheld device about the source, the spatial image of the background noise will change with time, something that could not be replicated when reconstructing the background noise for each channel independently. Therefore, a new approach to accommodate the problem for stereophonic signals is needed.

The system described in [10] addressed these problems by transmitting information for mono CNG along with parameter values that are used to re-synthesize the stereo image of the background noise in the decoder. This type of DTX system fits well for parametric stereo coders that apply a downmix to the two input channels before encoding and transmission from which the mono CNG parameters can be derived. However, in a discrete stereo coding scheme usually still two channels are coded in a jointly fashion and upmix parameters like a fine-grained coherence measure are usually not derived. Thus, for these kind of stereo coders, a different approach is needed.

SUMMARY

According to an embodiment, a multi-channel signal generator for generating a multi-channel signal having a first channel and a second channel, may have: a first audio source for generating a first audio signal; a second audio source for generating a second audio signal; a mixing noise source for generating a mixing noise signal; and a mixer for mixing the mixing noise signal and the first audio signal to obtain the first channel and for mixing the mixing noise signal and the second audio signal to obtain the second channel, wherein the mixer has: a first amplitude element for influencing an amplitude of the first audio signal; a first adder for adding an output signal of the first amplitude element and at least a portion of the mixing noise signal; a second amplitude element for influencing an amplitude of the second audio signal; a second adder for adding an output of the second amplitude element and at least a portion of the mixing noise signal, wherein an amount of influencing performed by the first amplitude element and an amount of influencing performed by the second amplitude element are equal to each other or the amount of influencing performed by the second amplitude element is different by less than 20 percent of the amount performed by the first amplitude element, wherein the mixer has a third amplitude element for influencing an amplitude of the mixing noise signal, wherein an amount of influencing performed by the third amplitude element depends on the amount of influencing performed by the first amplitude element or the second amplitude element, so that the amount of influencing performed by the third amplitude element becomes greater when the amount of influencing performed by the first amplitude element or the amount of influencing performed by the second amplitude element becomes smaller.

According to another embodiment, a multi-channel signal generator for generating a multi-channel signal having a first channel and a second channel, may have: a first audio source for generating a first audio signal; a second audio source for generating a second audio signal; a mixing noise source for generating a mixing noise signal; a mixer for mixing the mixing noise signal and the first audio signal to obtain the first channel and for mixing the mixing noise signal and the second audio signal to obtain the second channel, an input interface for receiving encoded audio data in a sequence of frames having an active frame and an inactive frame following the active frame; and an audio decoder for decoding coded audio data for the active frame to generate a decoded multi-channel signal for the active frame, wherein the first audio source, the second audio source, the mixing noise source and the mixer are active in the inactive frame to generate the multi-channel signal for the inactive frame, wherein the encoded audio data for the inactive frame has silence insertion descriptor data having comfort noise data indicating a signal energy for each channel of the two channels, or for each of a first linear combination of the first and second channels and a second linear combination of the first and second channels, for the inactive frame and indicating a coherence between the first channel and the second channel in the inactive frame, and wherein the mixer is configured to mix the mixing noise signal and the first audio signal or the second audio signal based on the comfort noise data indicating the coherence, and wherein the multi-channel signal generator further has a signal modifier for modifying the first channel and the second channel or the first audio signal or the second audio signal or the mixing noise signal, wherein the signal modifier is configured to be controlled by the comfort noise data indicating signal energies for the first audio channel and the second audio channel or indicating signal energies for a first linear combination of the first and second channels and a second linear combination of the first and second channels.

According to another embodiment, a multi-channel signal generator for generating a multi-channel signal having a first channel and a second channel, may have: a first audio source for generating a first audio signal; a second audio source for generating a second audio signal; a mixing noise source for generating a mixing noise signal; and a mixer for mixing the mixing noise signal and the first audio signal to obtain the first channel and for mixing the mixing noise signal and the second audio signal to obtain the second channel, wherein the first audio source is a first noise source and the first audio signal is a first noise signal, or the second audio source is a second noise source and the second audio signal is a second noise signal, wherein the first noise source or the second noise source is configured to generate the first noise signal or the second noise signal so that the first noise signal or the second noise signal are at least partially correlated, and wherein the mixing noise source is configured for generating the mixing noise signal with a first mixing noise portion and a second mixing noise portion, the second mixing noise portion being at least partially decorrelated from the first mixing noise portion; and wherein the mixer is configured for mixing the first mixing noise portion of the mixing noise signal and the first audio signal to obtain the first channel and for mixing the second mixing noise portion of the mixing noise signal and the second audio signal to obtain the second channel.

According to another embodiment, a method of generating a multi-channel signal having a first channel and a second channel, may have the steps of: generating a first audio signal using a first audio source; generating a second audio signal using a second audio source; generating a mixing noise signal using a mixing noise source; and mixing the mixing noise signal and the first audio signal to obtain the first channel and mixing the mixing noise signal and the second audio signal to obtain the second channel, the method having the steps of: using a first amplitude element influencing an amplitude of the first audio signal; using a first adder adding an output signal of the first amplitude element and at least a portion of the mixing noise signal; using a second amplitude element influencing an amplitude of the second audio signal; using a second adder adding an output of the second amplitude element and at least a portion of the mixing noise signal, wherein an amount of influencing performed by the first amplitude element and an amount of influencing performed by the second amplitude element are equal to each other or the amount of influencing performed by the second amplitude element is different by less than 20 percent of the amount performed by the first amplitude element, wherein mixing uses a third amplitude element influencing an amplitude of the mixing noise signal, wherein an amount of influencing performed by the third amplitude element depends on the amount of influencing performed by the first amplitude element or the second amplitude element, so that the amount of influencing performed by the third amplitude element becomes greater when the amount of influencing performed by the first amplitude element or the amount of influencing performed by the second amplitude element becomes smaller.

According to another embodiment, an audio encoder for generating an encoded multi-channel audio signal for a sequence of frames having an active frame and an inactive frame, may have: an activity detector for analyzing a multi-channel signal to determine a frame of the sequence of frames to be an inactive frame; a noise parameter calculator for calculating first parametric noise data for a first channel of the multi-channel signal, and for calculating second parametric noise data for a second channel of the multi-channel signal; a coherence calculator for calculating coherence data indicating a coherence situation between the first channel and the second channel in the inactive frame; and an output interface for generating the encoded multi-channel audio signal having encoded audio data for the active frame and, for the inactive frame, the first parametric noise data, the second parametric noise data, and/or a first linear combination of the first parametric noise data and the second parametric noise data and second linear combination of the first parametric noise data and the second parametric noise data, and the coherence data, wherein the noise parameter calculator is configured to convert at least some of the first parametric noise data and second parametric noise data from a left/right representation to a mid/side representation with a mid channel and a side channel.

According to another embodiment, an audio encoder for generating an encoded multi-channel audio signal for a sequence of frames having an active frame and an inactive frame, may have: an activity detector for analyzing a multi-channel signal to determine a frame of the sequence of frames to be an inactive frame; a noise parameter calculator for calculating first parametric noise data for a first channel of the multi-channel signal, and for calculating second parametric noise data for a second channel of the multi-channel signal; a coherence calculator for calculating coherence data indicating a coherence situation between the first channel and the second channel in the inactive frame; and an output interface for generating the encoded multi-channel audio signal having encoded audio data for the active frame and, for the inactive frame, the first parametric noise data, the second parametric noise data, and/or a first linear combination of the first parametric noise data and the second parametric noise data and second linear combination of the first parametric noise data and the second parametric noise data, and the coherence data, wherein the coherence calculator is configured: to calculate a real intermediate value and an imaginary intermediate value from complex spectral values for the first channel and the second channel in the inactive frame; to calculate a first energy value for the first channel and a second energy value for the second channel in the inactive frame; and to calculate the coherence data using the real intermediate value, the imaginary intermediate value, the first energy value and the second energy value, or to smooth at least one of the real intermediate value, the imaginary intermediate value, the first energy value and the second energy value, and to calculate the coherence data using at least one smoothed value, wherein the coherence calculator is configured to square a smoothed real intermediate value and to square a smoothed imaginary intermediate value and to add the squared values to obtain a first component number, wherein the coherence calculator is configured to multiply the smoothed first and second energy values to obtain a second component number, and to combine the first and the second component numbers to obtain a result number for the coherence value, on which the coherence data is based.

According to another embodiment, an audio encoder for generating an encoded multi-channel audio signal for a sequence of frames having an active frame and an inactive frame, may have: an activity detector for analyzing a multi-channel signal to determine a frame of the sequence of frames to be an inactive frame; a noise parameter calculator for calculating first parametric noise data for a first channel of the multi-channel signal, and for calculating second parametric noise data fora second channel of the multi-channel signal; a coherence calculator for calculating coherence data indicating a coherence situation between the first channel and the second channel in the inactive frame; and an output interface for generating the encoded multi-channel audio signal having encoded audio data for the active frame and, for the inactive frame, the first parametric noise data, the second parametric noise data, and/or a first linear combination of the first parametric noise data and the second parametric noise data and second linear combination of the first parametric noise data and the second parametric noise data, and the coherence data, wherein the noise parameter calculator is configured for comparing an energy of the second linear combination between the first parametric noise data and the second parametric noise data with a predetermined energy threshold, and: in case the energy of the second linear combination between the first parametric noise data and the second parametric noise data is greater than the predetermined energy threshold, the coefficients of the side channel noise shape vector are zeroed; and in case the energy of the second linear combination between the first parametric noise data and the second parametric noise data is smaller than the predetermined energy threshold, the coefficients of the side channel noise shape vector are maintained.

According to another embodiment, a method of audio encoding for generating an encoded multi-channel audio signal for a sequence of frames having an active frame and an inactive frame, may have the steps of: analyzing a multi-channel signal to determine a frame of the sequence of frames to be an inactive frame; calculating first parametric noise data for a first channel of the multi-channel signal, and/or for a first linear combination of a first and second channels of the multi-channel signal, and calculating second parametric noise data for a second channel of the multi-channel signal, and/or for a second linear combination of the first and second channels of the multi-channel signal; calculating coherence data indicating a coherence situation between the first channel and the second channel in the inactive frame; and generating the encoded multi-channel audio signal having encoded audio data for the active frame and, for the inactive frame, the first parametric noise data, the second parametric noise data, and the coherence data, wherein the noise parameter calculator is configured to convert at least some of the first parametric noise data and second parametric noise data from a left/right representation to a mid/side representation with a mid channel and a side channel.

Another embodiment may have a non-transitory digital storage medium having stored thereon a computer program for performing a method of generating a multi-channel signal having a first channel and a second channel, having the steps of: generating a first audio signal using a first audio source; generating a second audio signal using a second audio source; generating a mixing noise signal using a mixing noise source; and mixing the mixing noise signal and the first audio signal to obtain the first channel and mixing the mixing noise signal and the second audio signal to obtain the second channel, the method having the steps of: using a first amplitude element influencing an amplitude of the first audio signal; using a first adder adding an output signal of the first amplitude element and at least a portion of the mixing noise signal; using a second amplitude element influencing an amplitude of the second audio signal; using a second adder adding an output of the second amplitude element and at least a portion of the mixing noise signal, wherein an amount of influencing performed by the first amplitude element and an amount of influencing performed by the second amplitude element are equal to each other or the amount of influencing performed by the second amplitude element is different by less than 20 percent of the amount performed by the first amplitude element, wherein mixing uses a third amplitude element influencing an amplitude of the mixing noise signal, wherein an amount of influencing performed by the third amplitude element depends on the amount of influencing performed by the first amplitude element or the second amplitude element, so that the amount of influencing performed by the third amplitude element becomes greater when the amount of influencing performed by the first amplitude element or the amount of influencing performed by the second amplitude element becomes smaller, when said computer program is run by a computer.

Still another embodiment may have a non-transitory digital storage medium having stored thereon a computer program for performing a method of audio encoding for generating an encoded multi-channel audio signal for a sequence of frames having an active frame and an inactive frame, the method having the steps of: analyzing a multi-channel signal to determine a frame of the sequence of frames to be an inactive frame; calculating first parametric noise data for a first channel of the multi-channel signal, and/or for a first linear combination of a first and second channels of the multi-channel signal, and calculating second parametric noise data for a second channel of the multi-channel signal, and/or for a second linear combination of the first and second channels of the multi-channel signal; calculating coherence data indicating a coherence situation between the first channel and the second channel in the inactive frame; and generating the encoded multi-channel audio signal having encoded audio data for the active frame and, for the inactive frame, the first parametric noise data, the second parametric noise data, and the coherence data, wherein the noise parameter calculator is configured to convert at least some of the first parametric noise data and second parametric noise data from a left/right representation to a mid/side representation with a mid channel and a side channel, when said computer program is run by a computer.

According to another embodiment, an encoded multi-channel audio signal organized in a sequence of frames, the sequence of frames having an active frame and an inactive frame, may have: encoded audio data for the active frame; first parametric noise data for a first channel in the inactive frame; second parametric noise data for a second channel in the inactive frame; and coherence data indicating a coherence situation between the first channel and the second channel in the inactive frame.

The present examples provide efficient transmission of stereo speech signals. Transmitting a stereo signal can improve user experience and speech intelligibility over transmitting only one channel of audio (mono), especially in situations with imposed background noise or other sounds. Stereo signals can be coded in a parametrical fashion where a mono downmix of the two stereo channels is applied and this single downmix channel is coded and transmitted to the receiver along with side information that is used to approximate the original stereo signal in the decoder. Another approach is to employ discrete stereo coding which aims at removing redundancy between the channels to achieve a more compact two-channel representation of the original signal by means of some signal pre-processing. The two processed channels are then coded and transmitted. At the decoder, an inverse processing is applied. Still, side info relevant for the stereo processing can be transmitted along the two channels. The main difference between parametric and discrete stereo coding methods is therefore in the number of transmitted channels.

Typically, in a conversation there are periods in which not all of the speakers are actively speaking. The input signal to a speech coder in these periods, therefore, consists mainly of background noise or (near) silence. To save data rate and lower the load on the transmission network, speech coders try to distinguish between frames that contain speech (active frames) and frames that contain mainly background noise or silence (inactive frames). For inactive frames, the data rate can be significantly reduced by not coding the audio signal as in active frames, but instead deriving a parametric low-bitrate description of the current background noise in form of a Silence Insertion Descriptor (SID) frame. This SID frame is periodically transmitted to the decoder to update the parameters describing the background noise, while for inactive frames in between the bitrate is reduced or even no information is transmitted. In the decoder, the background noise is remodeled using the parameters transmitted in the SID frame by a Comfort Noise Generation (CNG) algorithm. This way, transmission rate can be lowered or even zeroed for inactive frames without the user interpreting it as an interruption or end of the connection.

We describe a DTX system for discretely coded stereo signals consisting of a stereo SID and a method for CNG that generates a stereo comfort noise by modelling the spectral characteristics of the background noise in both channels as well as the degree of correlation between them, while keeping the average bitrate comparable to mono applications.

In accordance to an aspect, there is provided a multi-channel signal generator for generating a multi-channel signal having a first channel and a second channel, comprising:

a first audio source for generating a first audio signal;

a second audio source for generating a second audio signal;

a mixing noise source for generating a mixing noise signal; and a mixer for mixing the mixing noise signal and the first audio signal to obtain the first channel and for mixing the mixing noise signal and the second audio signal to obtain the second channel.

According to an aspect, the first audio source is a first noise source and the first audio signal is a first noise signal, or the second audio source is a second noise source and the second audio signal is a second noise signal, wherein the first noise source or the second noise source is configured to generate the first noise signal or the second noise signal so that the first noise signal or the second noise signal is decorrelated from the mixing noise signal.

According to an aspect, the mixer is configured to generate the first channel and the second channel so that an amount of the mixing noise signal in the first channel is equal to an amount of the mixing noise signal in the second channel or is within a range of 80 percent to 120 percent of the amount of the mixing noise signal in the second channel.

According to an aspect, the mixer comprises a control input for receiving a control parameter, and wherein the mixer is configured to control an amount of the mixing noise signal in the first channel and the second channel in response to the control parameter.

According to an aspect, each of the first audio source, the second audio source and the mixing noise source is a Gaussian noise source.

According to an aspect, the first audio source comprises a first noise generator to generate the first audio signal as a first noise signal, wherein the second audio source comprises a decorrelator for decorrelating the first noise signal to generate the second audio signal as a second noise signal, and wherein the mixing noise source comprises a second noise generator, or wherein the first audio source comprises a first noise generator to generate the first audio signal as a first noise signal, wherein the second audio source comprises a second noise generator to generate the second audio signal as a second noise signal, and wherein the mixing noise source comprises a decorrelator for decorrelating the first noise signal or the second noise signal to generate the mixing noise signal, or wherein one of the first audio source, the second audio source and the mixing noise source comprises a noise generator to generate a noise signal, and wherein another one of the first audio source, the second audio source and the mixing noise source comprises a first decorrelator for decorrelating the noise signal, and wherein a further one of the first audio source, the second audio source and the mixing noise source comprises a second decorrelator for decorrelating the noise signal, wherein the first decorrelator and the second decorrelator are different from each other so that output signals of the first decorrelator and the second decorrelator are decorrelated from each other, or wherein the first audio source comprises a first noise generator, wherein the second audio source comprises a second noise generator, and wherein the mixing noise source comprises a third noise generator, wherein the first noise generator, the second noise generator and the third noise generator are configured to generate mutually decorrelated noise signals.

According to an aspect, one of the first audio source, the second audio source and the mixing noise source comprises a pseudo random number sequence generator configured for generating a pseudo random number sequence in response to a seed, and wherein at least two of the first audio source, the second audio source and the mixing noise source are configured to initialize the pseudo random number sequence generator using different seeds.

According to an aspect, at least one of the first audio source, the second audio source and the mixing noise source is configured to operate using a pre-stored noise table, or wherein at least one of the first audio source, the second audio source and the mixing noise source is configured to generate a complex spectrum for a frame using a first noise value for a real part and a second noise value for an imaginary part, wherein, optionally, at least one noise generator is configured to generate a complex noise spectral value for a frequency bin k using for one of the real part and the imaginary part, a first random value at an index k and using, for the other one of the real part and the imaginary part, a second random value at an index (k+M), wherein the first noise value and the second noise value are included in a noise array, e.g. derived from a random number sequence generator or a noise table or a noise process, ranging from a start index to an end index, the start index being lower than M, and the end index being equal to or lower than 2M, wherein M and k are integer numbers.

According to an aspect, the mixer comprises:

a first amplitude element for influencing an amplitude of the first audio signal;

a first adder for adding an output signal of the first amplitude element and at least a portion of the mixing noise signal;

a second amplitude element for influencing an amplitude of the second audio signal;

a second adder for adding an output of the second amplitude element and at least a portion of the mixing noise signal, wherein an amount of influencing performed by the first amplitude element and an amount of influencing performed by the second amplitude element are equal to each other or the amount of influencing performed by the second amplitude element is different by less than 20 percent of the amount performed by the first amplitude element.

According to an aspect, the mixer comprises a third amplitude element for influencing an amplitude of the mixing noise signal, wherein an amount of influencing performed by the third amplitude element depends on the amount of influencing performed by the first amplitude element or the second amplitude element, so that the amount of influencing performed by the third amplitude element becomes greater when the amount of influencing performed by the first amplitude element or the amount of influencing performed by the second amplitude element becomes smaller.

According to an aspect, an amount of influencing performed by the third amplitude element is the square root of a value $c_q$ and an amount of influencing performed by the first amplitude element and an amount of influencing performed by the second amplitude element is the square root of the difference between one and $c_q$.

According to an aspect, an input interface for receiving encoded audio data in a sequence of frames comprising an active frame and an inactive frame following the active frame; and an audio decoder for decoding coded audio data for the active frame to generate a decoded multi-channel signal for the active frame, wherein the first audio source, the second audio source, the mixing noise source and the mixer are active in the inactive frame to generate the multi-channel signal for the inactive frame.

According to an aspect, the encoded audio signal for the active frame has a first plurality of coefficients describing a first number of frequency bins; and the encoded audio signal for the inactive frame has a second plurality of coefficients describing a second number of frequency bins, wherein the first number of frequency bins is greater than the second number of frequency bins.

According to an aspect, the encoded audio data for the inactive frame comprises silence insertion descriptor data comprising comfort noise data indicating a signal energy for each channel of the two channels, or for each of a first linear combination of the first and second channels and a second linear combination of the first and second channels, for the inactive frame and indicating a coherence between the first channel and the second channel in the inactive frame, and wherein the mixer is configured to mix the mixing noise signal and the first audio signal or the second audio signal based on the comfort noise data indicating the coherence, and wherein the multi-channel signal generator further comprises a signal modifier for modifying the first channel and the second channel or the first audio signal or the second audio signal or the mixing noise signal, wherein the signal modifier is configured to be controlled by the comfort noise data indicating signal energies for the first audio channel and the second audio channel or indicating signal energies for a first linear combination of the first and second channels and a second linear combination of the first and second channels.

According to an aspect, the audio data for the inactive frame comprises:

a first silence insertion descriptor frame for the first channel and a second silence insertion descriptor frame for the second channel, wherein the first silence insertion descriptor frame comprises comfort noise parameter data for the first channel and/or for a first linear combination of the first and second channels, and comfort noise generation side information for the first channel and the second channel, and wherein the second silence insertion descriptor frame comprises comfort noise parameter data for the second channel, and/or for a second linear combination of the first and second channels and coherence information indicating a coherence between the first channel and the second channel in the inactive frame, and wherein the multi-channel signal generator comprises a controller for controlling the generation of the multi-channel signal in the inactive frame using the comfort noise generation side information for the first silence insertion descriptor frame to determine a comfort noise generation mode for the first channel and the second channel, and/or for a first linear combination of the first and second channels and a second linear combination of the first and second channels, using the coherence information in the second silence insertion descriptor frame to set a coherence between the first channel and the second channel in the inactive frame, and using the comfort noise parameter data from the first silence insertion descriptor frame and using the comfort noise parameter data from the second silence insertion descriptor frame for setting an energy situation the first channel and an energy situation of the second channel.

According to an aspect, the audio data for the inactive frame comprises:

at least one silence insertion descriptor frame for a first linear combination of the first and second channels and a second linear combination of the first and second channels, wherein the at least one silence insertion descriptor frame comprises comfort noise parameter data (p_noise) for the first linear combination of the first and second channels, and comfort noise generation side information for the second linear combination of the first and second channels, wherein the multi-channel signal generator comprises a controller for controlling the generation of the multi-channel signal in the inactive frame using the comfort noise generation side information for the first linear combination of the first and second channels and the second linear combination of the first and second channels, using the coherence information in the second silence insertion descriptor frame to set a coherence between the first channel and the second channel in the inactive frame, and using the comfort noise parameter data from the at least one silence insertion descriptor frame and using the comfort noise parameter data from the at least one silence insertion descriptor frame for setting an energy situation of the first channel and an energy situation of the second channel.

According to an aspect, a spectrum-time converter for converting a resulting first channel and a resulting second channel being spectrally adjusted and coherence-adjusted, into corresponding time domain representations to be combined with or concatenated to time domain representations of corresponding channels of the decoded multi-channel signal for the active frame.

According to an aspect, the audio data for the inactive frame comprises:

a silence insertion descriptor frame, wherein the silence insertion descriptor frame comprises comfort noise parameter data for the first and the second channel and comfort noise generation side information for the first channel and the second channel and/or for a first linear combination of the first and second channels and a second linear combination of the first and second channels, and coherence information indicating a coherence between the first channel and the second channel in the inactive frame, and wherein the multi-channel signal generator comprises a controller for controlling the generation of the multi-channel signal in the inactive frame using the comfort noise generation side information for the silence insertion descriptor frame to determine a comfort noise generation mode for the first channel and the second channel, using the coherence information in the silence insertion descriptor frame to set a coherence between the first channel and the second channel in the inactive frame, and using the comfort noise parameter data from the silence insertion descriptor frame for setting an energy situation of the first channel and an energy situation of the second channel.

According to an aspect, the encoded audio data for the inactive frame comprises silence insertion descriptor data comprising comfort noise data indicating a signal energy for each channel in a mid/side representation and coherence data indicating the coherence between the first channel and the second channel in the left/right representation, wherein the multi-channel signal generator is configured to convert the mid/side representation of the signal energy onto a left/right representation of the signal energy in the first channel and the second channel, wherein the mixer is configured to mix the mixing noise signal to the first audio signal and the second audio signal based on the coherence data to obtain the first channel and the second channel, and wherein the multi-channel signal generator further comprises a signal modifier configured for modifying the first and second channel by shaping the first and second channel based on the signal energy in the left/right domain.

According to an aspect, the multi-channel signal generator is configured, in case the audio data contain signalling indicating that the energy in the side channel is smaller than a predetermined threshold, to zero the coefficients of the side channel.

According to an aspect, the audio data for the inactive frame comprises:

at least one silence insertion descriptor frame, wherein the at least one silence insertion descriptor frame comprises comfort noise parameter data for the mid and the side channel and comfort noise generation side information for the mid and the side channel, and coherence information indicating a coherence between the first channel and the second channel in the inactive frame, and wherein the multi-channel signal generator comprises a controller for controlling the generation of the multi-channel signal in the inactive frame using the comfort noise generation side information for the silence insertion descriptor frame to determine a comfort noise generation mode for the first channel and the second channel, using the coherence information in the silence insertion descriptor frame to set a coherence between the first channel and the second channel in the inactive frame, and using the comfort noise parameter data, or a processed version thereof, from the silence insertion descriptor frame for setting an energy situation of the first channel and an energy situation of the second channel.

According to an aspect, the multi-channel signal generator is configured to scale signal energy coefficients for the first and second channel by gain information, encoded with the comfort noise parameter data for the first and second channel.

According to an aspect, the multi-channel signal generator is configured to convert the generated multi-channel signal from a frequency domain version to a time domain version.

According to an aspect, the first audio source is a first noise source and the first audio signal is a first noise signal, or the second audio source is a second noise source and the second audio signal is a second noise signal, wherein the first noise source or the second noise source is configured to generate the first noise signal or the second noise signal so that the first noise signal or the second noise signal are at least partially correlated, and the mixing noise source is configured for generating the mixing noise signal with a first mixing noise portion and a second mixing noise portion, the second mixing noise portion being at least partially decorrelated from the first mixing noise portion; and the mixer is for mixing the first mixing noise portion of the mixing noise signal and the first audio signal to obtain the first channel and for mixing the second mixing noise portion of the mixing noise signal and the second audio signal to obtain the second channel.

In accordance to an aspect, there is provided a method of generating a multi-channel signal having a first channel and a second channel, comprising:

generating a first audio signal using a first audio source;

generating a second audio signal using a second audio source;

generating a mixing noise signal using a mixing noise source; and mixing the mixing noise signal and the first audio signal to obtain the first channel and mixing the mixing noise signal and the second audio signal to obtain the second channel.

In accordance to an aspect, there is provided an audio encoder for generating an encoded multi-channel audio signal for a sequence of frames comprising an active frame and an inactive frame, the audio encoder comprising:

an activity detector for analyzing a multi-channel signal to determine a frame of the sequence of frames to be an inactive frame;

a noise parameter calculator for calculating first parametric noise data for a first channel of the multi-channel signal, and for calculating second parametric noise data for a second channel of the multi-channel signal;

a coherence calculator for calculating coherence data indicating a coherence situation between the first channel and the second channel in the inactive frame; and an output interface for generating the encoded multi-channel audio signal having encoded audio data for the active frame and, for the inactive frame, the first parametric noise data, the second parametric noise data, or a first linear combination of the first parametric noise data and the second parametric noise data and second linear combination of the first parametric noise data and the second parametric noise data, and the coherence data.

According to an aspect, the coherence calculator is configured to calculate a coherence value and to quantize) the coherence value to obtain a quantized coherence value, wherein the output interface is configured to use the quantized coherence value as the coherence data in the encoded multi-channel signal.

According to an aspect, the coherence calculator is configured:

to calculate a real intermediate value and an imaginary intermediate value from complex spectral values for the first channel and the second channel in the inactive frame;

to calculate a first energy value for the first channel and a second energy value for the second channel in the inactive frame; and to calculate the coherence data using the real intermediate value, the imaginary intermediate value, the first energy value and the second energy value, or to smooth at least one of the real intermediate value, the imaginary intermediate value, the first energy value and the second energy value, and to calculate the coherence data using at least one smoothed value.

According to an aspect, the coherence calculator is configured to calculate the real intermediate value as a sum over real parts of products of complex spectral values for corresponding frequency bins of the first channel and the second channel in the inactive frame, or to calculate the imaginary intermediate value as a sum over imaginary parts of products of the complex spectral values for corresponding frequency bins of the first channel and the second channel in the inactive frame.

According to an aspect, the coherence calculator is configured to square a smoothed real intermediate value and to square a smoothed imaginary intermediate value and to add the squared values to obtain a first component number, wherein the coherence calculator is configured to multiply the smoothed first and second energy values to obtain a second component number, and to combine the first and the second component numbers to obtain a result number for the coherence value, on which the coherence data is based.

According to an aspect, the coherence calculator is configured to calculate a square root of the result number to obtain a coherence value on which the coherence data is based.

According to an aspect, the coherence calculator is configured to quantize the coherence value using a uniform quantizer to obtain the quantized coherence value as an n bit number as the coherence data.

According to an aspect, the output interface is configured to generate a first silence insertion descriptor frame for the first channel and a second silence insertion descriptor frame for the second channel, wherein the first silence insertion descriptor frame comprises comfort noise parameter data for the first channel and comfort noise generation side information for the first channel and the second channel, and wherein the second silence insertion descriptor frame comprises comfort noise parameter data for the second channel and coherence information indicating a coherence between the first channel and the second channel in the inactive frame, or wherein the output interface is configured to generate a silence insertion descriptor frame, wherein the silence insertion descriptor frame comprises comfort noise parameter data for the first and the second channel and comfort noise generation side information for the first channel and the second channel, and coherence information indicating a coherence between the first channel and the second channel in the inactive frame or wherein the output interface is configured to generate a first silence insertion descriptor frame for the first channel and the second channel, and a second silence insertion descriptor frame for the first channel and the second channel, wherein the first silence insertion descriptor frame comprises comfort noise parameter data for the first channel and the second channel and comfort noise generation side information for the first channel and the second channel and wherein the second silence insertion descriptor frame comprises comfort noise parameter data for the first channel and the second channel and coherence information indicating a coherence between the first channel and the second channel in the inactive frame.

According to an aspect, the uniform quantizer is configured to calculate an n bit number so that the value for n is equal to a value of bits occupied by the comfort noise generation side information for the first silence insertion descriptor frame.

According to an aspect, the activity detector is configured for analyzing the first channel of the multi-channel signal to classify the first channel as active or inactive, and analyzing the second channel of the multi-channel signal to classify the second channel as active or inactive, and determining a frame of the sequence of frames to be an inactive frame if both the first channel and the second channel are classified as inactive.

According to an aspect, the noise parameter calculator is configured for calculating first gain information for the first channel and second gain information for the second channel, and to provide parametric noise data as first gain information for the first channel and second gain information.

According to an aspect, the noise parameter calculator is configured to convert at least some of the first parametric noise data and second parametric noise data from a left/right representation to a mid/side representation with a mid channel and a side channel.

According to an aspect, the noise parameter calculator is configured to reconvert the mid/side representation of at least some of the first parametric noise data and second parametric noise data onto a left/right representation, wherein the noise parameter calculator is configured to calculate, from the reconverted left/right representation, a first gain information for the first channel and second gain information for the second channel, and to provide, included in the first parametric noise data, the first gain information for the first channel, and, included in the second parametric noise data, the second gain information.

According to an aspect, the noise parameter calculator is configured to calculate:

the first gain information by comparing:

a version of the first parametric noise data for the first channel as reconverted from the mid/side representation to the left/right representation; with a version of the first parametric noise data for the first channel before being converted from the mid/side representation to the left/right representation; and/or the second gain information by comparing:

a version of the second parametric noise data for the second channel as reconverted from the mid/side representation to the left/right representation; with a version of the second parametric noise data for the second channel before being converted from the mid/side representation to the left/right representation.

According to an aspect, the noise parameter calculator is configured for comparing an energy of the second linear combination between the first parametric noise data and the second parametric noise data with a predetermined energy threshold, and:

in case the energy of the second linear combination between the first parametric noise data and the second parametric noise data is greater than the predetermined energy threshold, the coefficients of the side channel noise shape vector are zeroed; and in case the energy of the second linear combination between the first parametric noise data and the second parametric noise data is smaller than the predetermined energy threshold, the coefficients of the side channel noise shape vector are maintained.

According to an aspect, the audio encoder is configured to encode the second linear combination between the first parametric noise data and the second parametric noise data with a smaller amount of bits than an amount of bit through which the first linear combination between the first parametric noise data and the second parametric noise data is encoded.

According to an aspect, the output interface is configured:

to generate the encoded multi-channel audio signal having encoded audio data for the active frame using a first plurality of coefficients for a first number of frequency bins; and to generate the first parametric noise data, the second parametric noise data, or the first linear combination of the first parametric noise data and the second parametric noise data and second linear combination of the first parametric noise data and the second parametric noise data using a second plurality of coefficients describing a second number of frequency bins, wherein the first number of frequency bins is greater than the second number of frequency bins.

In accordance to an aspect, there is provided a method of audio encoding for generating an encoded multi-channel audio signal for a sequence of frames comprising an active frame and an inactive frame, the method comprising:

analyzing a multi-channel signal to determine a frame of the sequence of frames to be an inactive frame;

calculating first parametric noise data for a first channel of the multi-channel signal, and/or for a first linear combination of a first and second channels of the multi-channel signal, and calculating second parametric noise data for a second channel of the multi-channel signal, and/or for a second linear combination of the first and second channels of the multi-channel signal;

calculating coherence data indicating a coherence situation between the first channel and the second channel in the inactive frame; and generating the encoded multi-channel audio signal having encoded audio data for the active frame and, for the inactive frame, the first parametric noise data, the second parametric noise data, and the coherence data.

According to an aspect, there is provided a computer program for performing, when running on a computer or a processor, the method as above or below.

In accordance to an aspect, there is provided an encoded multi-channel audio signal organized in a sequence of frames, the sequence of frames comprising an active frame and an inactive frame, the encoded multi-channel audio signal comprising:

encoded audio data for the active frame;

first parametric noise data for a first channel in the inactive frame;

second parametric noise data for a second channel in the inactive frame; and coherence data indicating a coherence situation between the first channel and the second channel in the inactive frame.

According to an aspect, the first audio source is a first noise source and the first audio signal is a first noise signal, or the second audio source is a second noise source and the second audio signal is a second noise signal, wherein the first noise source or the second noise source is configured to generate the first noise signal or the second noise signal so that the first noise signal or the second noise signal is decorrelated from the mixing noise signal.

According to an aspect, the mixer is configured to generate the first channel and the second channel so that an amount of the mixing noise signal in the first channel is equal to an amount of the mixing noise signal in the second channel or is within a range of 80 percent to 120 percent of the amount of the mixing noise signal in the second channel.

According to an aspect, the mixer comprises a control input for receiving a control parameter, and wherein the mixer is configured to control an amount of the mixing noise signal in the first channel and the second channel in response to the control parameter.

According to an aspect, each of the first audio source, the second audio source and the mixing noise source is a Gaussian noise source.

According to an aspect, the first audio source comprises a first noise generator to generate the first audio signal as a first noise signal, wherein the second audio source comprises a decorrelator for decorrelating the first noise signal to generate the second audio signal as a second noise signal, and wherein the mixing noise source comprises a second noise generator, or wherein the first audio source comprises a first noise generator to generate the first audio signal as a first noise signal, wherein the second audio source comprises a second noise generator to generate the second audio signal as a second noise signal, and wherein the mixing noise source comprises a decorrelator for decorrelating the first noise signal or the second noise signal to generate the mixing noise signal, or wherein one of the first audio source, the second audio source and the mixing noise source comprises a noise generator to generate a noise signal, and wherein another one of the first audio source, the second audio source and the mixing noise source comprises a first decorrelator for decorrelating the noise signal, and wherein a further one of the first audio source, the second audio source and the mixing noise source comprises a second decorrelator for decorrelating the noise signal, wherein the first decorrelator and the second decorrelator are different from each other so that output signals of the first decorrelator and the second decorrelator are decorrelated from each other, or wherein the first audio source comprises a first noise generator, wherein the second audio source comprises a second noise generator, and wherein the mixing noise source comprises a third noise generator, wherein the first noise generator, the second noise generator and the third noise generator are configured to generate mutually decorrelated noise signals.

According to an aspect, one of the first audio source, the second audio source and the mixing noise source comprises a pseudo random number sequence generator configured for generating a pseudo random number sequence in response to a seed, and wherein at least two of the first audio source, the second audio source and the mixing noise source are configured to initialize the pseudo random number sequence generator using different seeds.

According to an aspect, at least one of the first audio source, the second audio source and the mixing noise source is configured to operate using a pre-stored noise table, or wherein at least one of the first audio source, the second audio source and the mixing noise source is configured to generate a complex spectrum for a frame using a first noise value for a real part and a second noise value for an imaginary part, wherein, optionally, the at least one noise generator is configured to generate a complex noise spectral value for a frequency bin k using for one of the real part and the imaginary part, a first random value at an index k and using, for the other one of the real part and the imaginary part, a second random value at an index (k+M), wherein the first noise value and the second noise value are included in a noise array, e.g. derived from a random number sequence generator or a noise table or a noise process, ranging from a start index to an end index, the start index being lower than M, and the end index being equal to or lower than 2M, wherein M and k are integer numbers.

According to an aspect, the mixer comprises:

a first amplitude element for influencing an amplitude of the first audio signal;

a first adder for adding an output signal of the first amplitude element and at least a portion of the mixing noise signal;

a second amplitude element for influencing an amplitude of the second audio signal;

a second adder for adding an output of the second amplitude element and at least a portion of the mixing noise signal, wherein an amount of influencing performed by the first amplitude element and an amount of influencing performed by the second amplitude element are equal to each other or different by less than 20 percent of the amount performed by the first amplitude element.

According to an aspect, the mixer comprises a third amplitude element for influencing an amplitude of the mixing noise signal, wherein an amount of influencing performed by the third amplitude element depends on the amount of influencing performed by the first amplitude element or the second amplitude element, so that the amount of influencing performed by the third amplitude element becomes greater when the amount of influencing performed by the first amplitude element or the amount of influencing performed by the second amplitude element becomes smaller.

According to an aspect, the multi-channel signal generator, further comprising:

an input interface for receiving encoded audio data in a sequence of frames comprising an active frame and an inactive frame following the active frame; and an audio decoder for decoding coded audio data for the active frame to generate a decoded multi-channel signal for the active frame, wherein the first audio source, the second audio source, the mixing noise source and the mixer are active in the inactive frame to generate the multi-channel signal for the inactive frame.

According to an aspect, the encoded audio data for the inactive frame comprises silence insertion descriptor data comprising comfort noise data indicating a signal energy for each channel of the two channels for the inactive frame and indicating a coherence between the first channel and the second channel in the inactive frame, and wherein the mixer is configured to mix the mixing noise signal and the first audio signal or the second audio signal based on the comfort noise data indicating the coherence, and wherein the multi-channel signal generator further comprises a signal modifier for modifying the first channel and the second channel or the first audio signal or the second audio signal or the mixing noise signal, wherein the signal modifier is configured to be controlled by the comfort noise data indicating signal energies for the first audio channel and the second audio channel.

According to an aspect, the audio data for the inactive frame comprises:

a first silence insertion descriptor frame for the first channel and a second silence insertion descriptor frame for the second channel, wherein the first silence insertion descriptor frame comprises comfort noise parameter data for the first channel and comfort noise generation side information for the first channel and the second channel, and wherein the second silence insertion descriptor frame comprises comfort noise parameter data for the second channel and coherence information indicating a coherence between the first channel and the second channel in the inactive frame, and wherein the multi-channel signal generator comprises a controller for controlling the generation of the multi-channel signal in the inactive frame using the comfort noise generation side information for the first silence insertion descriptor frame to determine a comfort noise generation mode for the first channel and the second channel, using the coherence information in the second silence insertion descriptor frame to set a coherence between the first channel and the second channel in the inactive frame, and using the comfort noise generation data from the first silence insertion descriptor frame and using the comfort noise generation parameter data from the second silence insertion descriptor frame for setting an energy situation of the first channel and an energy situation of the second channel.

According to an aspect, further comprising a spectrum-time converter for converting a resulting first channel and a resulting second channel being spectrally adjusted and coherence-adjusted, into corresponding time domain representations to be combined with or concatenated to time domain representations of corresponding channels of the decoded multi-channel signal for the active frame.

According to an aspect, the audio data for the inactive frame comprises:

a silence insertion descriptor frame, wherein the silence insertion descriptor frame comprises comfort noise parameter data for the first and the second channel and comfort noise generation side information for the first channel and the second channel, and coherence information indicating a coherence between the first channel and the second channel in the inactive frame, and wherein the multi-channel signal generator comprises a controller for controlling the generation of the multi-channel signal in the inactive frame using the comfort noise generation side information for the silence insertion descriptor frame to determine a comfort noise generation mode for the first channel and the second channel, using the coherence information in the second silence insertion descriptor frame to set a coherence between the first channel and the second channel in the inactive frame, and using the comfort noise generation data from the silence insertion descriptor frame for setting an energy situation of the first channel and an energy situation of the second channel.

According to an aspect, the first audio source is a first noise source and the first audio signal is a first noise signal, or the second audio source is a second noise source and the second audio signal is a second noise signal, wherein the first noise source or the second noise source is configured to generate the first noise signal or the second noise signal so that the first noise signal or the second noise signal are at least partially correlated, and wherein the mixing noise source is configured for generating the mixing noise signal with a first mixing noise portion and a second mixing noise portion, the second mixing noise portion being at least partially decorrelated from the first mixing noise portion; and wherein the mixer is configured for mixing the first mixing noise portion of the mixing noise signal and the first audio signal to obtain the first channel and for mixing the second mixing noise portion of the mixing noise signal and the second audio signal to obtain the second channel.

According to an aspect, the method of generating a multi-channel signal having a first channel and a second channel, comprising:

generating a first audio signal using a first audio source;

generating a second audio signal using a second audio source;

generating a mixing noise signal using a mixing noise source; and mixing the mixing noise signal and the first audio signal to obtain the first channel and mixing the mixing noise signal and the second audio signal to obtain the second channel.

According to an aspect, there is provided an audio encoder for generating an encoded multi-channel audio signal for a sequence of frames comprising an active frame and an inactive frame, the audio encoder comprising:

an activity detector for analyzing a multi-channel signal to determine a frame of the sequence of frames to be an inactive frame;

a noise parameter calculator for calculating first parametric noise data for a first channel of the multi-channel signal and for calculating second parametric noise data for a second channel of the multi-channel signal;

a coherence calculator for calculating coherence data indicating a coherence situation between the first channel and the second channel in the inactive frame; and an output interface for generating the encoded multi-channel audio signal having encoded audio data for the active frame and, for the inactive frame, the first parametric noise data, the second parametric noise data, and the coherence data.

According to an aspect, the coherence calculator is configured to calculate a coherence value and to quantize the coherence value to obtain a quantized coherence value, wherein the output interface is configured to use the quantized coherence value as the coherence data in the encoded multi-channel signal.

According to an aspect, the coherence calculator is configured:

to calculate a real intermediate value and an imaginary intermediate value from complex spectral values for the first channel and the second channel in the inactive frame;

to calculate a first energy value for the first channel and a second energy value for the second channel in the inactive frame; and to calculate the coherence data using the real intermediate value, the imaginary intermediate value, the first energy value and the second energy value, or to smooth at least one of the real intermediate value, the imaginary intermediate value, the first energy value and the second energy value, and to calculate the coherence data using at least one smoothed value.

According to an aspect, the coherence calculator is configured to calculate the real intermediate value as a sum over real parts of products of complex spectral values for corresponding frequency bins of the first channel and the second channel in the inactive frame, or to calculate the imaginary intermediate value as a sum over imaginary parts of products of the complex spectral values for corresponding frequency bins of the first channel and the second channel in the inactive frame.

According to an aspect, the coherence calculator is configured to square a smoothed real intermediate value and to square a smoothed imaginary intermediate value and to add the squared values to obtain a first component number, wherein the coherence calculator is configured to multiply the smoothed first and second energy values to obtain a second component number, and to combine the first and the second component numbers to obtain a result number for the coherence value, on which the coherence data is based.

According to an aspect, there is provided an audio encoder, wherein the coherence calculator is configured to calculate a square root of the result number to obtain a coherence value on which the coherence data is based.

According to an aspect, the coherence calculator is configured to quantize the coherence value using a uniform quantizer to obtain the quantized coherence value as an N bit number as the coherence data.

According to an aspect, there is provided an audio encoder, wherein the output interface is configured to generate a first silence insertion descriptor frame for the first channel and a second silence insertion descriptor frame for the second channel, wherein the first silence insertion descriptor frame comprises comfort noise parameter data for the first channel and comfort noise generation side information for the first channel and the second channel, and wherein the second silence insertion descriptor frame comprises comfort noise parameter data for the second channel and coherence information indicating a coherence between the first channel and the second channel in the inactive frame, or wherein the output interface is configured to generate a silence insertion descriptor frame, wherein the silence insertion descriptor frame comprises comfort noise parameter data for the first and the second channel and comfort noise generation side information for the first channel and the second channel, and coherence information indicating a coherence between the first channel and the second channel in the inactive frame.

According to an aspect, the uniform quantizer is configured to calculate an N bit number so that the value for N is equal to a value of bits occupied by the comfort noise generation side information for the first silence insertion descriptor frame.

According to an aspect, the method of audio encoding for generating an encoded multi-channel audio signal for a sequence of frames comprising an active frame and an inactive frame, the method comprising:

analyzing a multi-channel signal to determine a frame of the sequence of frames to be an inactive frame;

calculating first parametric noise data for a first channel of the multi-channel signal and calculating second parametric noise data for a second channel of the multi-channel signal;

calculating coherence data indicating a coherence situation between the first channel and the second channel in the inactive frame; and generating the encoded multi-channel audio signal having encoded audio data for the active frame and, for the inactive frame, the first parametric noise data, the second parametric noise data, and the coherence data.

According to an aspect, the encoded multi-channel audio signal organized in a sequence of frames, the sequence of frames comprising an active frame and an inactive frame, the encoded multi-channel audio signal comprising:

encoded audio data for the active frame;

first parametric noise data for a first channel in the inactive frame;

second parametric noise data for a second channel in the inactive frame; and coherence data indicating a coherence situation between the first channel and the second channel in the inactive frame.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
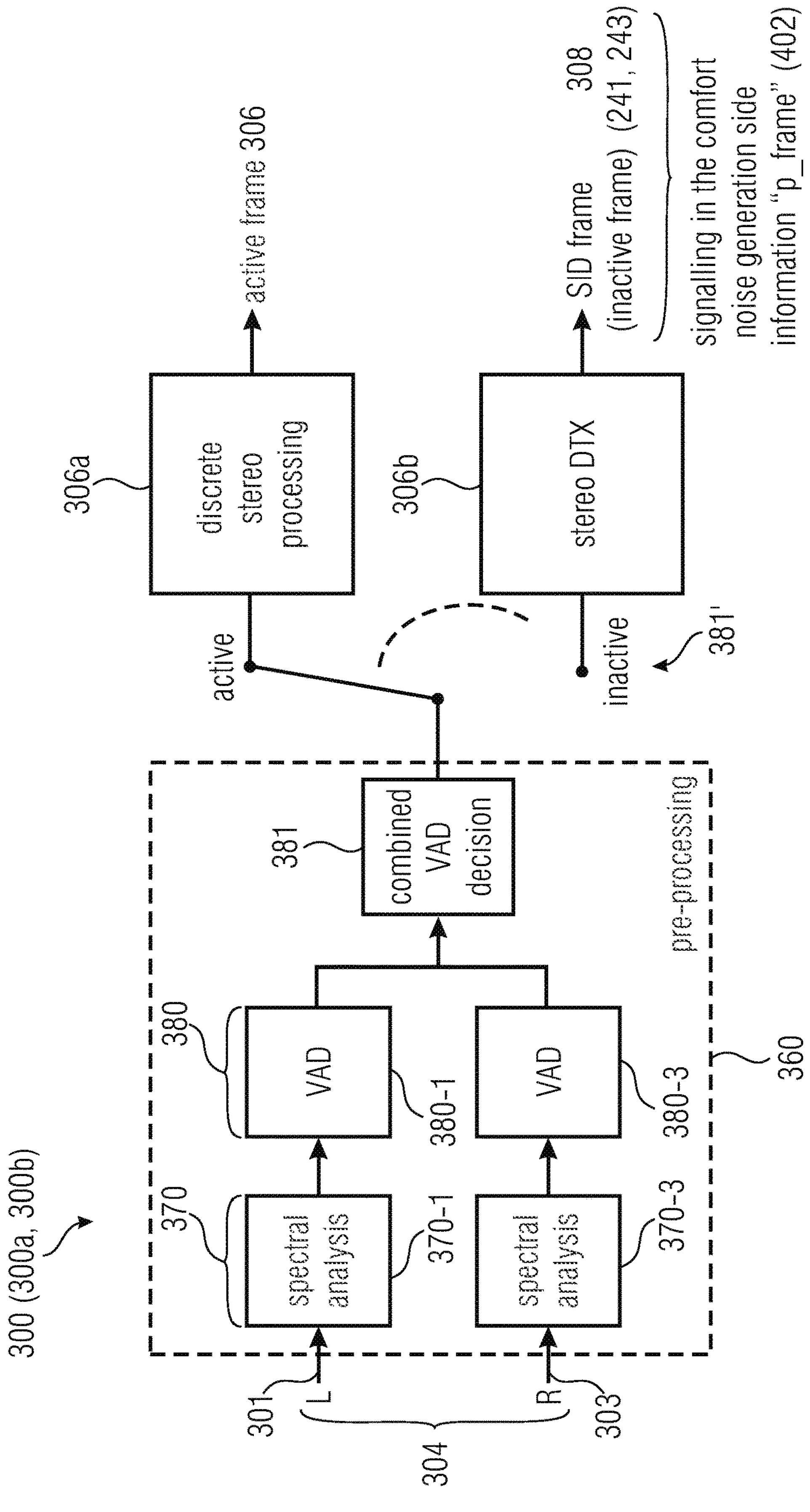
FIG. 1 shows an example at an encoder, in particular to classify a frame as active or inactive.

In the present document, we describe, inter alia, a new technique e.g. for DTX and CNG for discretely coded stereo signals. Instead of operating on a mono downmix of the stereo signal, noise parameters for both channels are derived, jointly coded and transmitted. In the decoder (or more in general in a multi-channel generator), three independent comfort noise signals may be mixed based on a single wide-band inter-channel coherence value that is transmitted e.g. along the two sets of noise parameters. Some of the aspects of the examples may cover, in some examples, at least one of the following aspects:

CNG in the decoder by mixing, for example, three independent noise signals. After decoding of the stereo SID and reconstructing the noise parameters for the left and right channel, two noise signals may be generated e.g. as a mixture of correlated and uncorrelated noise. For this, one common noise source for both channels (serving as the correlated noise source) and two individual noise sources (providing uncorrelated noise) may be mixed together. The mixing process may be controlled by the inter-channel coherence value transmitted in the stereo SID. After the mixing, the two mixed noise signals are spectrally shaped using the reconstructed noise parameters for the left and right channels, respectively.

Joint coding of the noise parameters may be derived from the two channels of a stereo signal. To keep the bitrate of the stereo SID low, the noise parameters may further be compressed before coding them in the stereo SID. This may be achieved e.g. by converting the left/right channel representation of the noise parameters into a mid/side representation and coding the side noise parameters with a smaller number of bits than the mid noise parameters.

An SID for two-channel DTX (stereo SID). This SID may contain noise parameters for both channels of a stereo signal along with a single wide-band inter-channel coherence value and a flag indicating equal noise parameters for both channels.

It will be shown that examples below may be implemented in devices, apparatus, systems, methods, controllers and non-transitory storage units storing instructions which, when executed by a processor, cause the processor to carry out the disclosed techniques (e.g. methods, like sequences of operations).

In particular, at least one of the blocks below may be controlled by a controller.

EXAMPLES

Before discussing in detail the aspects of the present examples, a quick overview of some of the most important ones is provided:

1) FIGS. 3*a*-3*f* show examples of multi-channel signal generators (e.g. formed by at least one first signal, or channel, and one second audio signal, or channel), which generate a multi-channel audio signal (e.g. at a decoder). The multi-channel audio signal (originally in the form of multiple, decorrelated channels) may be influenced (e.g. scaled) by an amplitude element(s). The amount of influencing may be based on a coherence data between first and second audio signals as estimated at the encoder. The first and second audio signals may be subjected to mixing with a common mixing signal (which may also be decorrelated and influenced, e.g. scaled, by the coherence data). The amount of influencing for the mixing signal may be so that the first and the second audio signals are scaled by a high weight (e.g. 1 or less than, but e.g. close to, 1) when the mixing signal is scaled by a low weight (e.g. 0 or more than, but e.g. close to, 0), and vice versa. The amount of influencing for the mixing signal may be so that a high coherence as measured at the encoder causes the first and second audio signals to be scaled by a low weight (e.g. 0 or more than, but e.g. close to, 0), and a high coherence as measured at the encoder causes the first and second audio signals to be scaled by a high weight (e.g. 1 or less than, but e.g. close to, 1). The techniques of FIGS. 3*a*-3*f* may be used for implementing a comfort noise generator (CNG).

Figure 2:
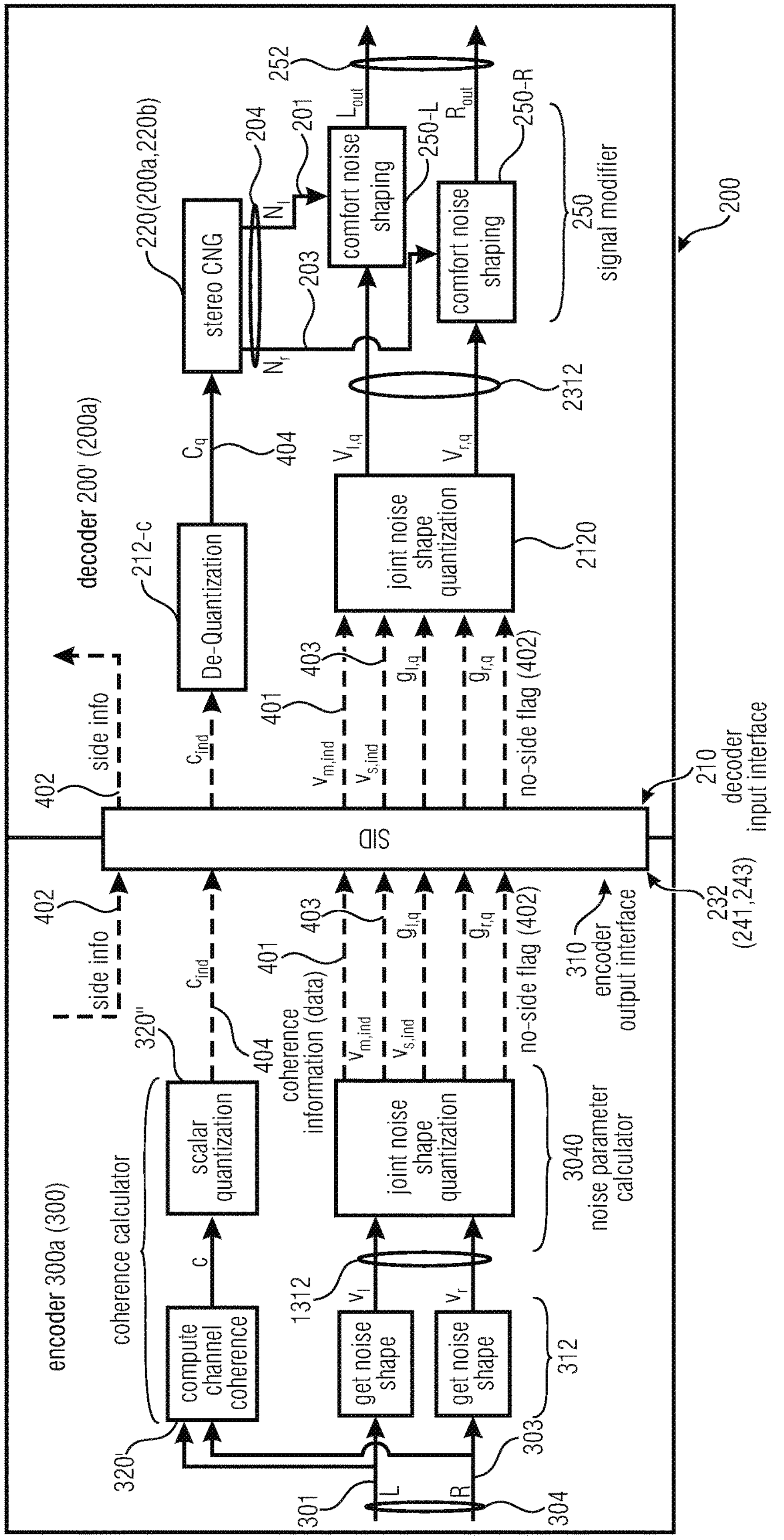
FIG. 2 shows an example of an encoder and a decoder.
Figure 3B:
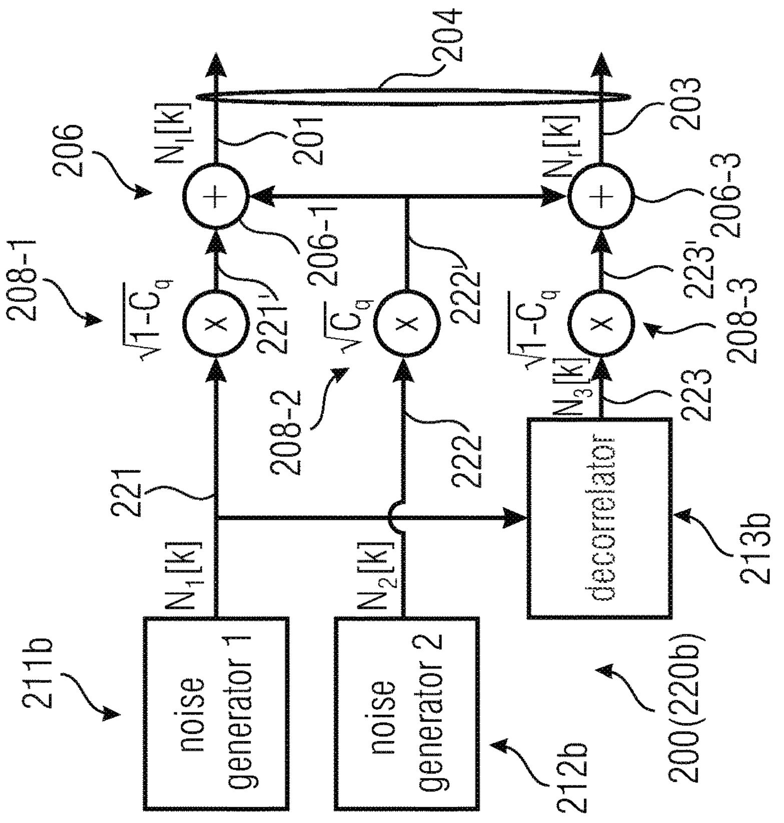
FIG. 3*a*-3*f* show examples of multi-channel signal generators, which may be used in a decoder.
Figure 3A:
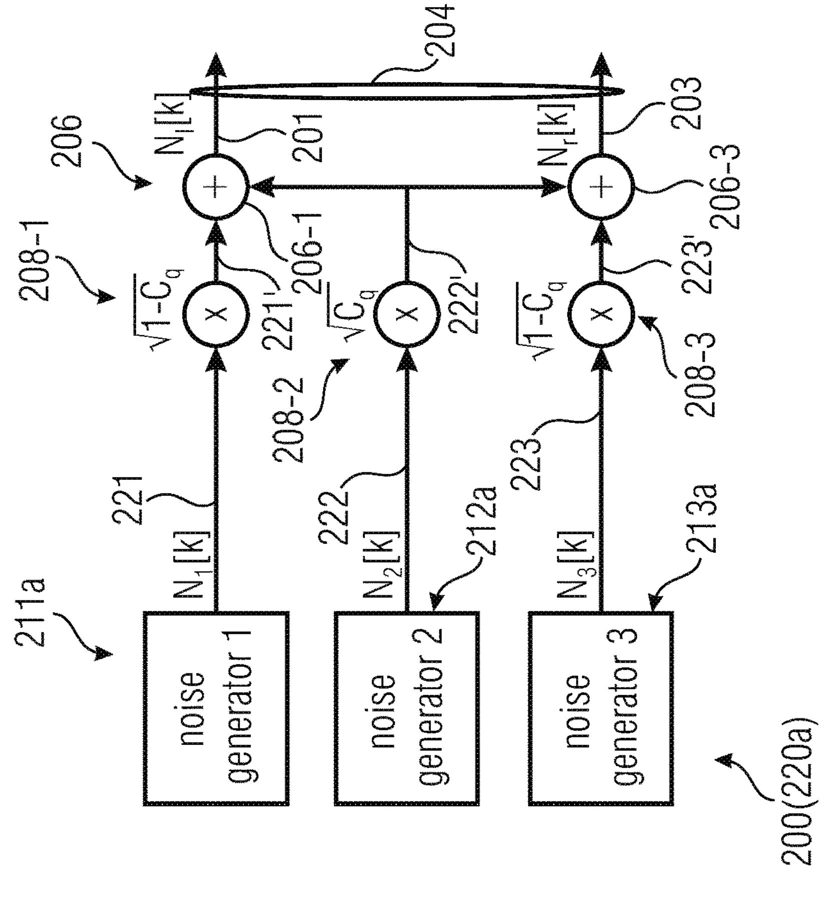
Figure 3D:
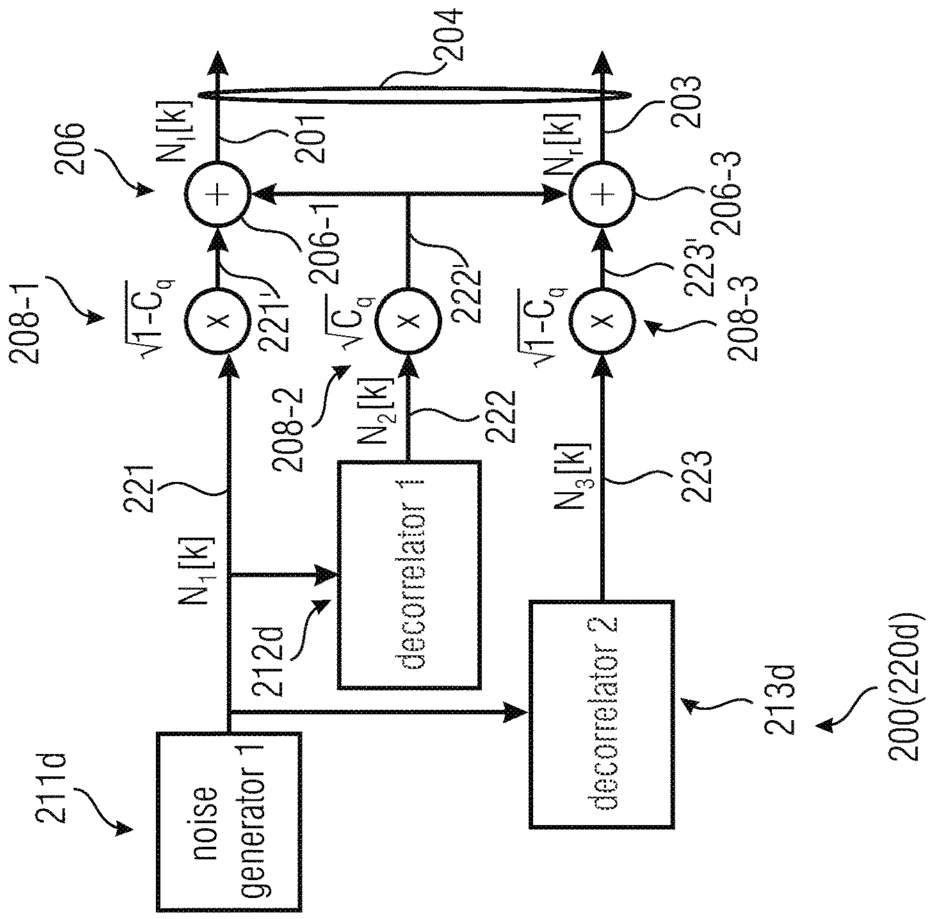
Figure 3C:
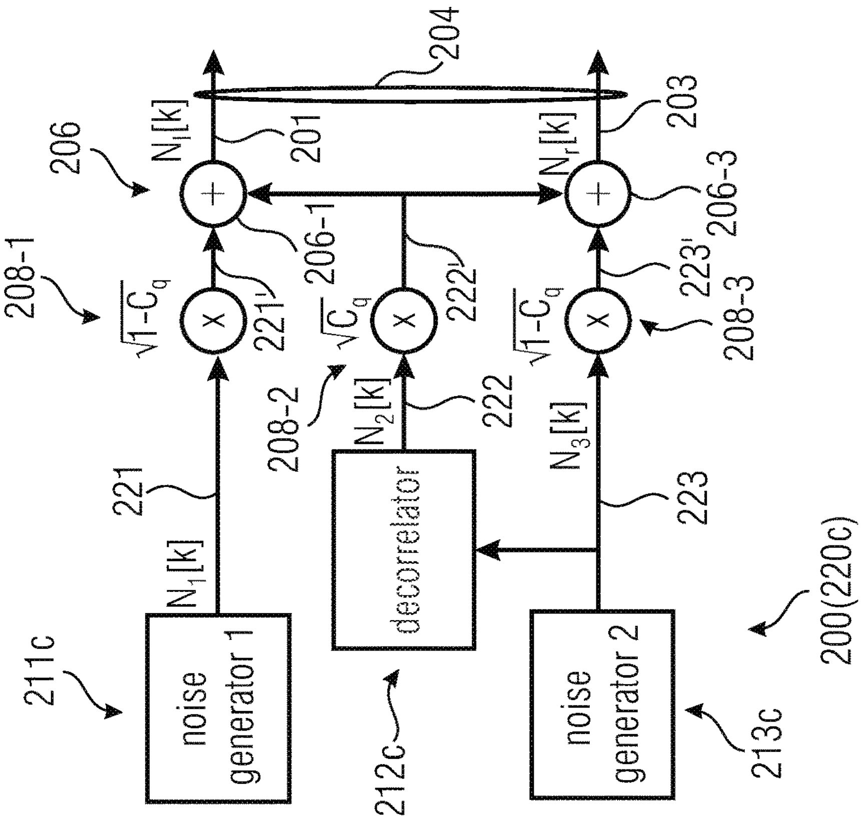
Figure 3E:
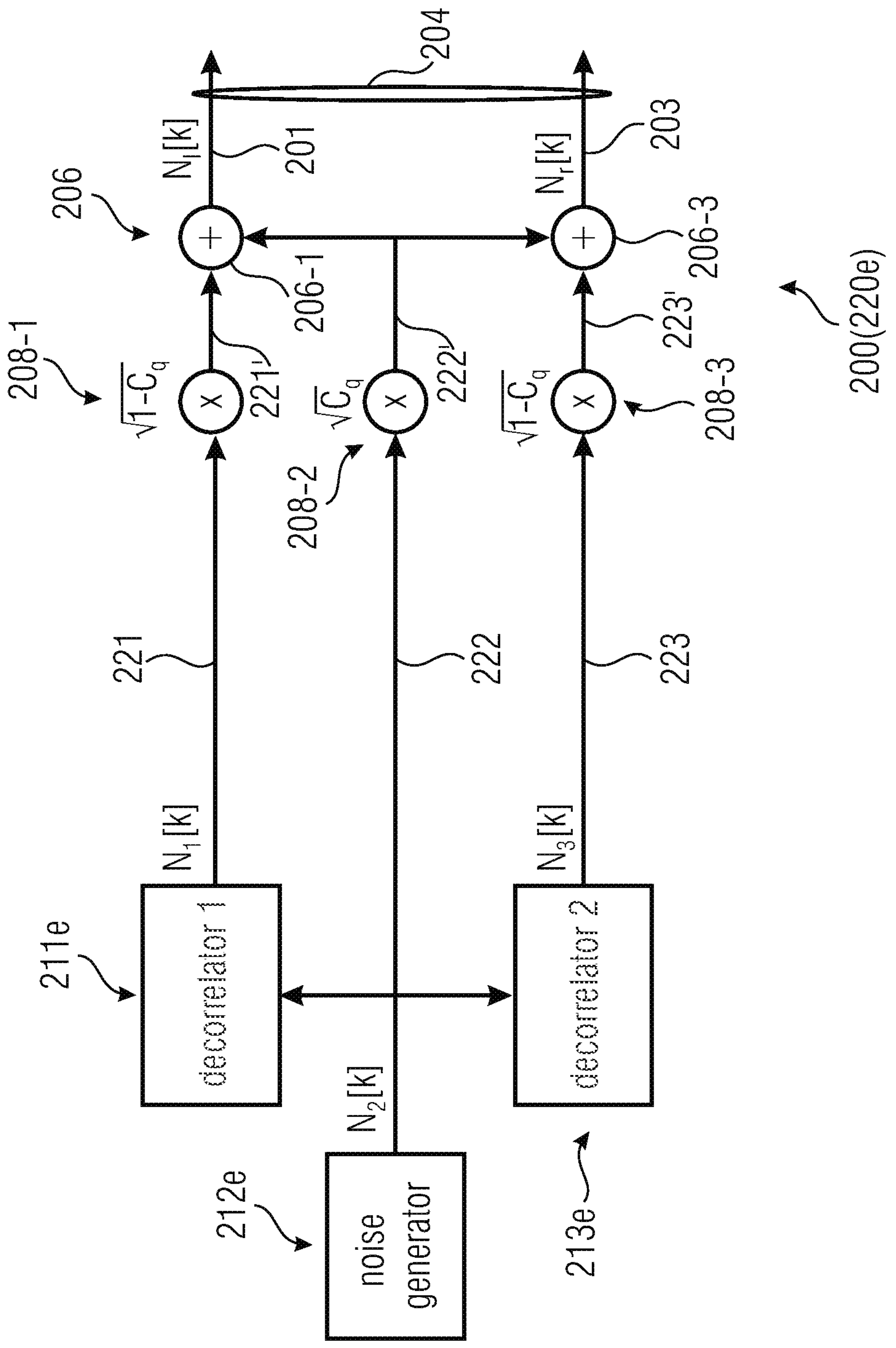
Figure 3F:
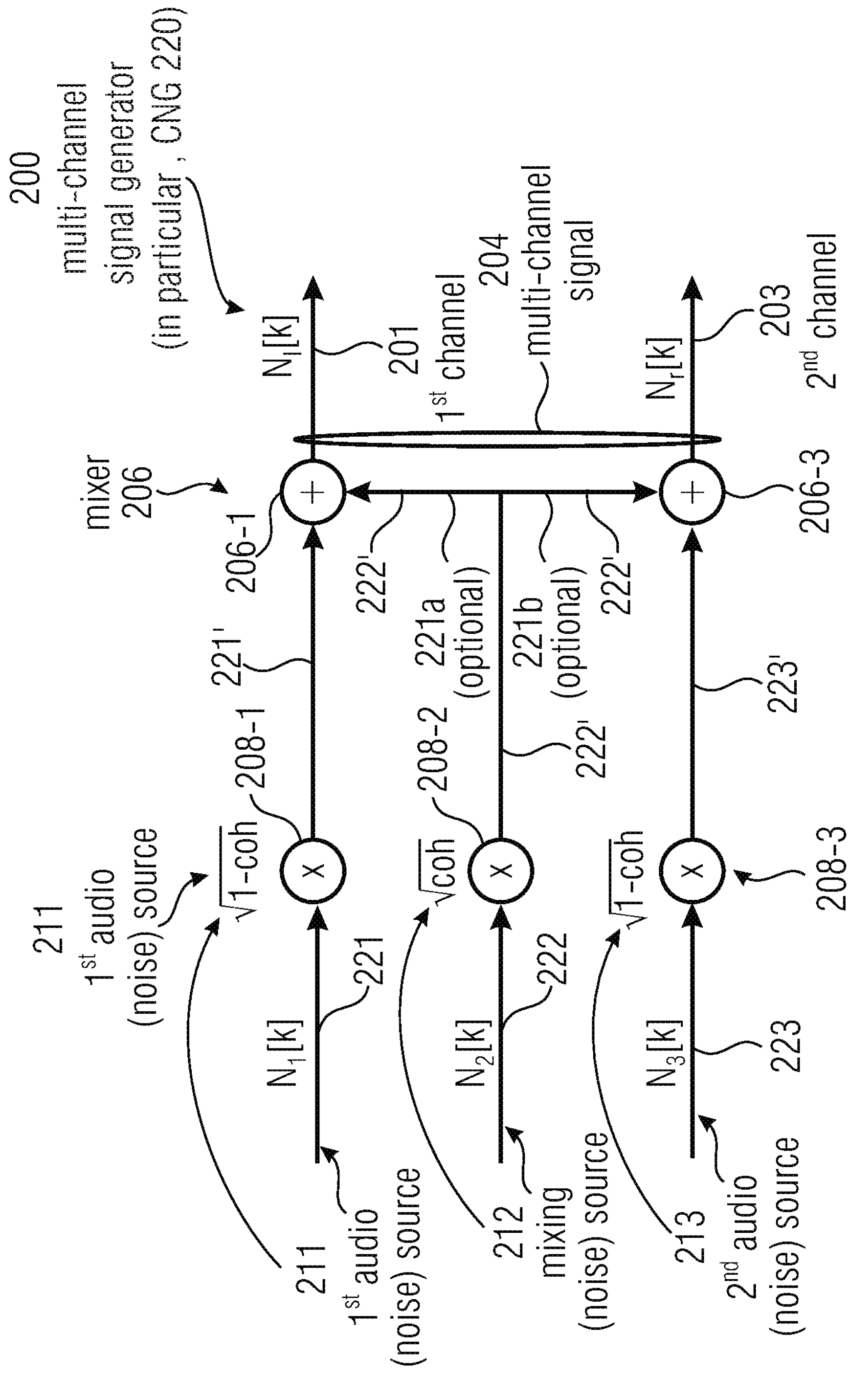
Figure 4:
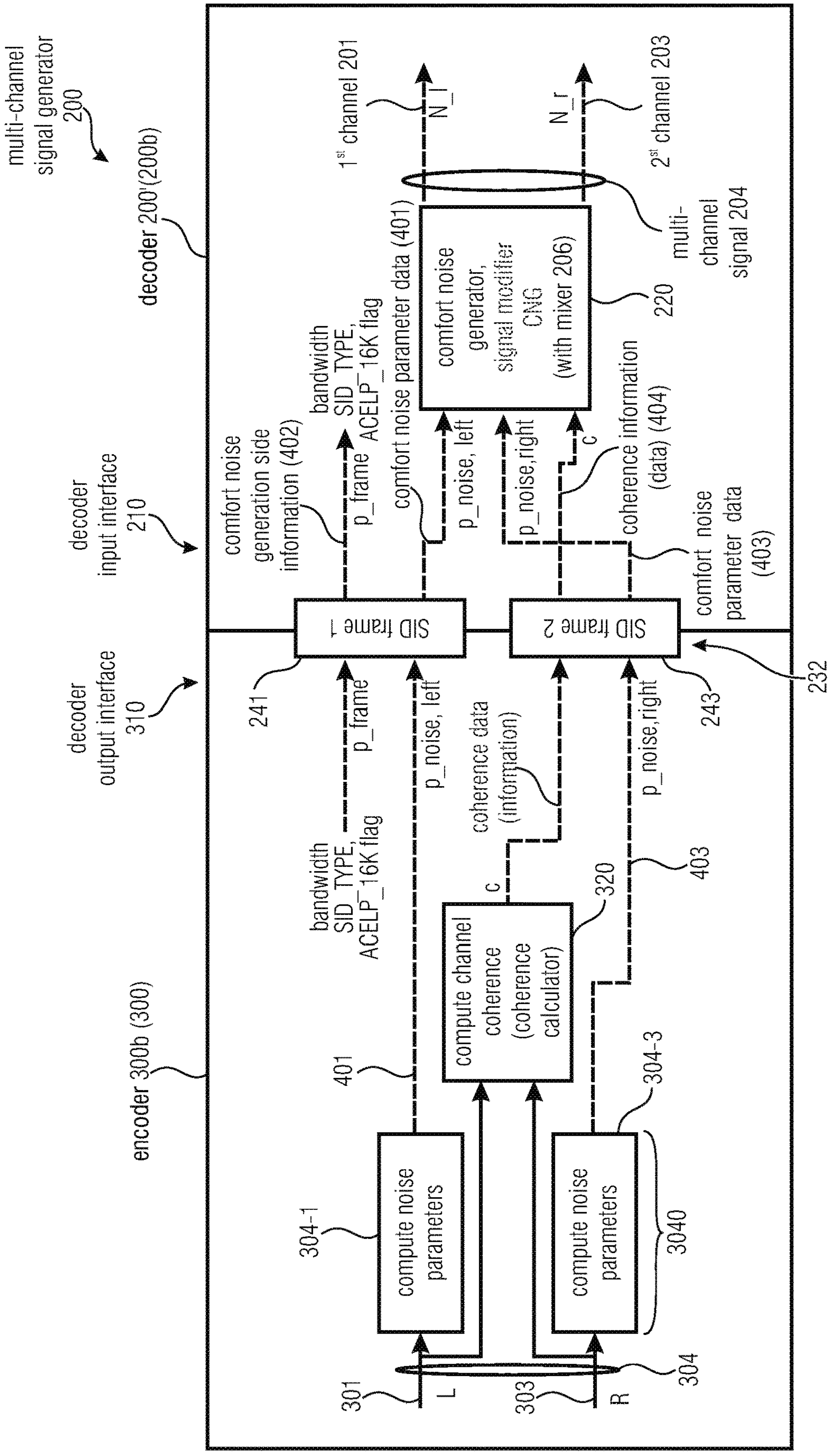
FIG. 4 shows an example of an encoder and a decoder.

2) FIGS. 1, 2 and 4 show examples of encoders. An encoder may classify an audio frame as active or inactive. If the audio frame is inactive, then only some parametric noise data are encoded in the bitstream (e.g. to provide parametric noise shape, which give a parametric representation of the shape of the noise, without the necessity of providing the noise signal itself), and coherence data between the two channels may also be provided.
3) FIGS. 2 and 4 show examples of decoders. A decoder may generate an audio signal (comfort noise) e.g. by:
    a. using one of the techniques shown in FIGS. 3*a*-3*f* (point 1) above) (in particular taking into account the coherence value provided by the encoder and applying it as weight at the amplitude element(s)); and
    b. shaping the generated audio signal (comfort noise) using the parametric noise data as encoded in the bitstream.

Notably, it is not necessary for the encoder to provide the complete audio signal for the inactive frame, but only the coherence value and the parametric representation of the noise shape, thereby reducing the amount of bits to be encoded in the bitstream.

Signal Generator (e.g. Decoder Side), CNG

FIGS. 3*a*-3*f* show examples of a CNG, or more in general a multi-channel signal generator 200, for generating a multi-channel signal 204 having a first channel 201 and a second channel 203. (In the present description, generated audio signals 221 and 223 are considered to be noise but different kinds of signals are also possible which are not noise.) Reference is initially made to FIG. 3*f*, which is general, while FIGS. 3*a*-3*e* show particular examples.

A first audio source 211 may be a first noise source and may be indicated here to generate the first audio signal 221, which may be a first noise signal. The mixing noise source 212 may generate a mixing noise signal 222. The second audio source 213 may generate a second audio signal 223 which may be a second noise signal. The multi-channel signal generator 200 may mix the first audio signal (first noise signal) 221 with the mixing noise signal 222 and the second audio signal (second noise signal) 223 with the mixing noise signal 222. (In addition or alternative, the first audio signal 221 may be mixed with a version 221*a* of the mixing noise signal 222, and the second audio signal 223 may be mixed with a version 221*b* of the mixing noise signal 222, wherein the versions 221*a* and 221*b* may differ, for example, for a 20% from each other; each of the versions 221*a* and 221*b* may be, for example, an upscaled and/or downscaled version of a common signal 222). Accordingly, a first channel 201 of the multi-channel signal 204 may be obtained from the first audio signal (first noise signal) 221 and the mixing noise signal 222. Analogously, the second channel 203 of the multi-channel signal 204 may be obtained from the second audio signal 223 mixed with the mixing noise signal 222. It is also noted that the signals may be here in the frequency domain, and k refers to the particular index or coefficient (associated with a particular frequency bin).

As can be seen from FIGS. 3*a*-3*f*, the first audio signal 221, the mixing noise signal 222 and the second audio signal 223 may be decorrelated with each other. This may be obtained, for example, by decorrelating the same signal (e.g. at a decorrelator) and/or by independently generating noise (examples are provided below).

A mixer 208 may be implemented for mixing the first audio signal 221 and the second audio signal 223 with the mixing noise signal 222. The mixing may be of the type of adding signals (e.g. at adder stages 206-1 and 206-3) after that the first audio signal 221, the mixing noise signal 222 and the second audio signal 223 have been weighted by scaling (e.g., at amplitude elements 208-1, 208-2, 208-3). Mixing is of the type "adding together after weighting". FIGS. 3*a*-3*f* show the actual signal processing that is applied to generate the noise signals $N_l[k]$ and $N_r[k]$ with the addition (+) element denoting the sample-wise addition of two signals (k is the index of the frequency bin).

The amplitude elements (or weighting elements or scaling elements) 208-1, 208-2 and 208-3 may be obtained, for example, by scaling the first audio signal 221, the mixing noise signal 222, and the second audio signal 223 by suitable coefficients, and may output a weighted version 221' of the first audio signal 221, a weighted version 222' of the mixing noise signal 222, and a weighted version 223' of the second audio signal 223. The suitable coefficients may be sqrt(coh) and sqrt(1-coh) and may be obtained, for example, from coherence information encoded in signaling a particular descriptor frame (see also below) (sqrt refers here to the square root operation). The coherence "coh" is below discussed in detail, and may be, for example, that indicated with "c" or "$c_{ind}$" or "$c_q$" below, e.g. encoded in a coherence information 404 of a bitstream 232 (see below, in combination with FIGS. 2 and 4). Notably, the mixing noise signal 222 may be subjected, for example, to a scaling by a weight which is a square root of a coherence value, while the first audio signal 221 and the second audio signal 222 may be scaled by a weight which is the square root of the value complementary to one of the coherence coh. Notwithstanding, the mixing noise signal 222 may be considered as a common mode signal, a portion of which is mixed to the weighted version 221' of the first audio signal 221 and the weighted version 223' of the second audio signal 223 so as to obtain the first channel 201 of the multi-channel signal 204 and the second channel 203 of the multi-channel signal 204, respectively. In some cases, the first noise source 211 or the second noise source 213 may be configured to generate the first noise signal 221 or the second noise signal 223 so that the first noise signal 221 and/or the second noise signal 223 is decorrelated from the mixing noise signal 222 (see below with reference to FIGS. 3*b*-3*e*).

At least one (or each of) the first audio source 211, the second audio source 213 and the mixing noise source 212) may be a Gaussian noise source.

In the example of FIG. 3*a*, the first audio source 211 (here indicated with 211*a*) may comprise or be connected to a first noise generator, and the second audio source 213 (213*a*) may comprise or be connected to a second noise generator. The mixing noise source 212 (212*a*) may comprise or be connected to a third noise generator. The first noise generator 211 (211*a*), the second noise generator 213 (213*a*) and the third noise generator 212 (212*a*) may generate mutually decorrelated noise signals.

In examples, at least one of the first audio source 211 (211*a*), the second audio source 213 (213*a*) and the mixing noise source 212 (212*a*) may operate using a pre-stored noise table, which may therefore provide a random sequence.

In some examples, at least one of the first audio source 211, the second audio source 213 and the mixing noise source 212 may generate a complex spectrum for a frame using a first noise value for a real part and a second noise value for an imaginary part. Optionally, the at least one noise generator may generate a complex noise spectral value (e.g. coefficient) for a frequency bin k using for one of the real part and the imaginary part, a first random value at an index k and using, for the other one of the real part and the imaginary part, a second random value at an index (k+M). The first noise value and the second noise value may be included in a noise array, e.g. derived from a random number sequence generator or a noise table or a noise process, ranging from a start index to an end index, the start index being lower than M, and the end index being equal to or lower than 2×M (which is the double of M). M and k may be integer numbers (k being the index of the particular bit frequency bin in the frequency domain representation of the signal).

Each audio source 211, 212, 213 may include at least one audio source generator (noise generator) which generates the noise, for example, in terms of $N_1[k]$, $N_2[k]$, $N_3[k]$.

The multi-channel signal generator 200 of FIGS. 3*a*-3*f* may be used, for example, for a decoder 200*a*, 200*b* (200'). In particular, the multi-channel signal generator 200 can be seen as a part of the comfort noise generator (CNG) 220 in FIG. 4. The decoder 200 may be used in general for decoding signals which have been encoded by an encoder, or by generating signals which to be shaped by energy information obtained from a bitstream, so as to generate an audio signal which corresponds to an original input audio signal input to the encoder. In some examples, there is a classification between the frames with speech (or in general non-void audio signals) and silence insertion descriptor frames. As explained above and below, the silence insertion descriptor frames (SID) (the so-called "inactive frames 308", which may be encoded as SID frames 241 and/or 243, for example) are provided in general below bit rate information and are therefore less frequently provided than the normal speech frames (the so-called "active frames 306", see also below). Further, the information which is present in the silence insertion description frames (SID, inactive frames 308) is in general limited (and may substantially correspond to energy information on the signal).

Notwithstanding, it has been understood that it is possible to complement the content of the SID frames with the multi-channel noise 204 generated by the multi-channel signal generator. Basically, the audio sources 211, 212, 213 may process signals (e.g., noise) which may be independent and uncorrelated with each other. The first audio signal 221, the mixing noise signal 222 and the second audio signal 223 may notwithstanding be scaled by coherence information provided by the encoder and inserted in the bitstream. As can be seen from FIGS. 3*a*-3*f*, the coherence value may be the same of the mixing noise signal 222 provides a common mode signal to both the first audio signal 221 and the second audio signal 223, hence permitting to obtain the first channel 201 and the second channel 203 of the multi-channel signal 204. The coherence signal is in general a value between 0 and 1:

- Coherence equal to 0 means that the original first audio channel (e.g. L, 301) and the second audio channel (e.g. R, 303) are totally uncorrelated with each other, and the amplitude element 208-2 of the mixing noise signal 222 will scale by 0 the mixing noise signal 222, which will cause that the first audio signal 221 and the second audio signal 223 will not be mixed with any common mode signal (by being mixed with the signal which is constantly 0), and the output channels 201, 203 will be substantially the same as the first noise signal 221 and the second noise signal 223 of the multi-channel signal 204.
- Coherence equal to 1 means that the original first audio channel (e.g. L, 301) and the second audio channel (e.g. R, 303) shall be the same, and the amplitude elements 208-1 and 208-3 will scale by 0 the input signals, and the first and second channels are then equal to the mixing noise signal 222 (which is scaled by 1 at amplitude element 208-2).
- Coherences intermediate between 0 and 1 will cause intermediate mixings between the two situations above.

Some aspects and variants of the mixer 206 and/or the CNG 220 are now discussed.

The first audio source (211) may be a first noise source and the first audio signal (221) may be a first noise signal, or the second audio source (213) is a second noise source and the second audio signal (223) is a second noise signal. The first noise source (211) or the second noise source (213) may be configured to generate the first noise signal (221) or the second noise signal (223), so that the first noise signal (221) or the second noise signal (223) is decorrelated from the mixing noise signal (222).

The mixer (206) may be configured to generate the first channel (201) and the second channel (203) so that the amount of the mixing noise signal (222) in the first channel (201) is equal to the amount of the mixing noise signal (222) in the second channel (203), or is within a range of 80 percent to 120 percent of the amount of the mixing noise signal (222) in the second channel (203) (e.g. its portions 221*a* and 221*b* are different within a range of 80 percent to 120 percent from each other and from the original mixing noise signal 222).

In some cases,

- the amount of influencing performed by the first amplitude element (208-1) and the amount of influencing performed by the second amplitude element (208-3) are equal to each other (e.g. when there is no distinction between portions 221*a* and 221*b*), or
- the amount of influencing performed by the second amplitude element (208-3) is different by less than 20 percent of the amount performed by the first amplitude element (208-1) (e.g. when difference between portions 221*a* and 221*b* is less than 20%).

The mixer (206) and/or the CNG 220 may comprise a control input for receiving a control parameter (404, c). The mixer (206) may therefore be configured to control the amount of the mixing noise signal (222) in the first channel (201) and the second channel (203) in response to the control parameter (404, c).

In FIGS. 3*a*-3*f*, it is shown that the mixing noise signal 222 is subjected to a coefficient sqrt(coh), and the first and second audio signals 221, 223 are subjected to a coefficient sqrt(1-coh).

As explained above, FIG. 3*a* shows a CNG 220*a* in which the first source 211*a* (211), the second source 213*a* (213) and the mixing noise source 212*a* (212) comprise different generators. This is not strictly necessary, and several variants are possible.

More in general:

1. $1^{st}$ variant CNG 220*b*, (FIG. 3*b*):
   a. the first audio source 211*b* (211) may comprise a first noise generator to generate the first audio signal (221) as a first noise signal,
   b. the second audio source 213*b* (213) may comprise a decorrelator for decorrelating the first noise signal (221) to generate the second audio signal (213) as a second noise signal (e.g. the second audio signal being obtained from the first audio signal after a decorrelation), and
   c. the mixing noise source 212*b* (212) may comprise a second noise generator (which is natively uncorrelated from the first noise generator);
2. $2^{nd}$ variant CNG 220*c* (FIG. 3*c*):
   a. the first audio source 211*c* (211) may comprise a first noise generator to generate the first audio signal (221) as a first noise signal,
   b. the second audio source 213*c* (213) may comprise a second noise generator to generate the second audio signal (223) as a second noise signal (e.g. the second noise generator being natively uncorrelated from the first noise generator), and
   c. the mixing noise source 212*c* (212) may comprise a decorrelator for decorrelating the first noise signal (221) or the second noise signal (223) to generate the mixing noise signal (222);
3. $3^{rd}$ variant CNG 220*d* (FIGS. 3*d* and 3*e*):
   a. one of the first audio source 211*d* or 211*e* (211), the second audio source 213*d* or 213*e* (213), and the mixing noise source 212*d* or 212*e* (212) may comprise a noise generator to generate a noise signal,
   b. another one of the first audio source 211*d* or 211*e* (211), the second audio source 213*d* or 213*e* (213) and the mixing noise source 212*d* or 212*e* (212) may comprise a first decorrelator for decorrelating the noise signal, and
   c. a further one of the first audio source 211*d* or 211*e* (211), the second audio source 213*d* or 213*e* (213) and the mixing noise source 212*d* or 212*e* (212) may comprise a second decorrelator for decorrelating the noise signal,
   d. the first decorrelator and the second decorrelator may be different from each other, so that output signals of the first decorrelator and the second decorrelator are decorrelated from each other;
4. $4^{th}$ variant CNG 220 (FIG. 3*a*):
   a. the first audio source 211*a* (211) comprises a first noise generator,
   b. the second audio source 213*a* (213) comprises a second noise generator,
   c. the mixing noise source 212*a* (212) comprises a third noise generator,
   d. the first noise generator, the second noise generator and the third noise generator may be generated mutually decorrelated noise signals (e.g. the tree generators being natively uncorrelated from each other).
5. $5^{th}$ variant:
   a. of the first audio source (211), the second audio source (213) and the mixing noise source (212) may comprise a pseudo random number sequence generator to generate a pseudo random number sequence in response to a seed,
   b. at least two of the first audio source (211), the second audio source (213) and the mixing noise source (212) may initialize the pseudo random number sequence generator using different seeds.
6. $6^{th}$ variant:
   a. at least one of the first audio source (211), the second audio source (213) and the mixing noise source (212) may operate using a pre-stored noise table,
   b. optionally, at least one of the first audio source (211), the second audio source (213) and the mixing noise source (212) may generate a complex spectrum for a frame using a first noise value for a real part and a second noise value for an imaginary part
   c. optionally, at least one noise generator may generate a complex noise spectral value for a frequency bin k using for one of the real part and the imaginary part, a first random value at an index k and using, for the other one of the real part and the imaginary part, a second random value at an index (k+M) (the first noise value and the second noise value are included in a noise array, e.g. derived from a random number sequence generator or a noise table or a noise process, ranging from a start index to an end index, the start index being lower than M, and the end index being equal to or lower than 2×M, M and k being integer numbers)

As can be seen from FIG. 4, the decoder 200' (200*a*, 200*b*) may include, besides the CNG 220 of FIG. 3, also an input interface 210 for receiving encoded audio data in a sequence of frames comprising an active frame and an inactive frame following the active frame; and an audio decoder for decoding coded audio data for the active frame to generate a decoded multi-channel signal for the active frame, wherein the first audio source 211, the second audio source 213, the mixing noise source 212 and the mixer 206 are active in the inactive frame to generate the multi-channel signal for the inactive frame.

Notably, the active frames are those which are classified by the encoder as having speech (or any other kind of non-noise sound) and the inactive frames are those which are classified to have silence or only noise.

Any of the examples of the CNG 220 (220*a*-220*e*) may be controlled by a suitable controller.

Encoder

An encoder is now discussed. The encoder may encode active frames and inactive frames. For the inactive frames, the encoder may encode parametric noise data (e.g. noise shape and/or coherence value) without encoding the audio signal entirely. It is noted that the encoding of the inactive audio frames may be reduced with respect to the active audio frames, so as to reduce the amount of information to be encoded in the bitstream. Also the parametric noise data (e.g. noise shape) for the inactive frames may have less information for each frequency band and/or may have less bins than those encoded in the active frames. The parametric noise data may be given in the left/right domain or in another domain (e.g. mid/side domain), e.g. by providing a first linear combination between parametric noise data of the first and second channels and a second linear combination between parametric noise data of the first and second channels (in some cases, it is also possible to provide gain information which are not associated to the first and second linear combinations, but are given in the left/right domain). The first and second linear combinations are in general linearly independent from each other.

The encoder may include an activity detector which classifies whether a frame is active or inactive.

FIGS. 1, 2 and 4 show examples of encoders 300*a* and 300*b* (which are also referred to as 300 when it is not necessary to distinguish between the encoder 300*a* from the encoder 300*b*). Each audio encoder 300 may generate an encoded multi-channel audio signal 232 for a sequence of frames of an input signal 304. The input signal 304 is here considered to be divided between a first channel 301 (also indicated as left channel or "l", where "l" is the letter whose capital version is "L" and is the first letter of "left" in English) and a second channel 303 (or "r", where "r" is the letter whose capital version is "R" and is the first letter of "right" in English).

The encoded multi-channel audio signal 232 may be defined in a sequence of frames, which may be, for example, in the time domain (e.g. each sample "n" may refer to a particular time instant and the samples of one frame may form a sequence, e.g., a sampling sequence of an input audio signal or a sequence after having filtered an input audio signal).

Encoder 300 (300*a*, 300*b*) may include an activity detector 380, which is not shown in FIGS. 2 and 4 (despite being in some examples implemented therein), but is shown in FIG. 1. FIG. 1 shows that each frame of the input signal 304 may be classified either an "active frame 306" or an "inactive frame 308". An inactive frame 308 is so that the signal is considered to be silence (and, for example, there is only silence or noise), while the active frame 306 may have some detection of no-noise audio signal (e.g., speech, music, etc.).

In the encoded multi audio signal 232 as encoded (e.g., bitstream) by the encoder 300, the information on whether the frame is an active frame 306 or a silence frame 308 may be signalled for example in the so-called "comfort noise generation side information" 402 (p_frame), also called "side information".

FIG. 1 shows a pre-processing stage 360 which may determine (e.g. classify) whether a frame is an active frame 306 or silent frame 308. It is here noted that the channels 301 and 303 of the input signal 304 are indicated with capital letters, like L (301, left channel) and R (303, right channel) to indicate that they are in the frequency domain. As can be seen in FIG. 1, a spectral analysis step stage 370 may be applied (a first spectral analysis 370-1 to the first channel 301, L; and a second stage 370-3 for the second channel 303, R). The spectral analysis stage 370 may be performed for each frame of the input signal 304 and may be based, for example, on harmonicity measurements. Notably, in some examples, the spectral analysis is performed by stage 370 on the first channel 301 may be performed separately from the spectral analysis performed on second channel 303 of the same frame. In some cases, the spectral analysis stage 370 may include the calculation of energy-related parameters, such as the average energy for a range of predefined frequency bands and the total average energy.

An activity detection stage 380 (which may be considered a voice activity detection in the case of the voice is searched for) can be applied. A first activity detection stage 380-1 may be applied to the first channel 301 (and in particular to the measurements performed on the first channel), and the second activity detection stage 380-3 may be applied to the second channel 303 (and in particular to the measurements performed on the second channel). In examples, the activity detection stage 380 may estimate the energy of the background noise in the input signal 304 and use that estimate to calculate a signal-to-noise ratio, which is compared to a signal-to-noise-ratio threshold to determine whether the frame is classified to be active or inactive (i.e. calculated signal-to-noise ratio being over the signal-to-noise-ratio threshold implying that the frame is classified as active; and calculated signal-to-noise ratio being below the signal-to-noise-ratio threshold implying that the frame is classified as inactive). In examples, the stage 380 may compare the harmonicity as obtained by the spectral analysis stages 370-1 and 370-3, respectively, with one or two harmonicity thresholds (e.g., a first threshold for the first channel 301 and a second threshold for the second channel 303). In both cases, it may be possible to classify not only each frame, but also each channel of each frame as being either an active channel or an inactive channel.

A decision 381 may be performed, and on the basis of it, it is possible to decide (as identified by switch 381') whether to perform a discrete stereo processing 306*a* or a stereo discontinuous transmission processing (stereo DTX) 306*b*. Notably, in case of active frame (and discrete stereo processing 306*a*), the encoding can be performed according to any strategy or processing standard or process, and is therefore here not further analyzed in detail. Most of the discussion below will regard to the stereo DTX 306*b*.

Notably, in examples a frame is classified (at stage 381) as inactive frame only if both channels 301 and 303 are classified as inactive by stages 380-1 and 380-3, respectively. Therefore, problems are avoided in the activity detection decision as discussed above. In particular, it is not necessary to signal the classification of active/inactive for each channel for each frame (thereby reducing the signalling), and a synchronization between the channels is inherently obtained. Further, where the decoder is as discussed in the present document, it is possible to make use of the coherence between the first and second channels 301 and 303 and to generate some noise signals, which are correlated/decorrelated according to the coherence obtained for the signal 304. Now, the elements of the encoder 300 (300*a*, 300*b*) which are used for encoding the inactive frame are discussed in detail. As explained, any other technique may be used for encoding the active frames 308, and is therefore not discussed here.

In general terms, the encoder 300*a*, 300*b* (300) may include a noise parameter calculator 3040 for calculating parametric noise data 401, 403 for the first and second channels 301, 303. The noise parameter calculator 3040 may calculate parametric noise data 401, 403 (e.g. indices and/or gains) for the first channel 301 and the second channel 303. The noise parameter calculator 3040 may therefore provide encoded audio data 232 in a sequence of frames which may comprise active frames 306 and inactive frames 308 (which may follow the active frames 306). In particular, in the case of inactive frames 308, the encoded audio data 232 may be encoded as one or two silence insertion description frames (SID) 241, 243. In some examples (e.g. in FIG. 2), there is only one single SID frame, in some other, there are two SID frames (e.g. in FIG. 4).

An inactive frame 308 may include, in particular, at least one of:

- comfort noise generation side information (e.g., 402, p_frame);
- comfort noise parameter data 401 for the first channel 301 or a first linear combination of comfort noise parameter data for the first channel 301 and comfort noise parameter data for the second channel ($v_{l,ind}$, $v_{m,ind}$ p_noise, gain $g_{l,q}$);
- comfort noise parameter data 403 for the second channel 303 or a second linear combination of comfort noise parameter data for the first channel 301 and comfort noise parameter data for the second channel ($v_{r,ind}$, $v_{s,ind}$, p_noise, gain $g_{r,q}$);
- coherence information (coherence data) (c, 404).

In some examples, a first silence insertion descriptor frame 241 may include the first two items of the list above, and a second silence insertion descriptor frame 243 may include the last two features in the specific data fields. Notwithstanding, different protocols may provide different data fields or different organization of the bitstream. However, in some cases (e.g. in FIG. 2), there can be only one single inactive frame for noise parameters for both channels.

It will be shown that the coherence information (e.g., part of the "silence insertion descriptor") may include one single value (e.g., encoded in few bits, like four bits) which indicates coherence information (e.g., correlation data), e.g. the coherence between the first channel 301 and the second channel 303 of the same inactive frame 308. On the other side, the comfort noise parameter data 401, 403, may indicate, for each channel 301, 303, signal energy for the inactive frame 308 (e.g., it may substantially provide an envelope), or anyway may provide noise shape information. The envelope or the noise shape information may be in the form of multiple coefficients for frequency bins and a gain for each channel. The noise shape information may be obtained at stage 312 (see below) using the original input channels (301, 303) and then the mid/side encoding is done on the noise shape parameter vectors. It will be shown that in the decoder it may be possible to generate some noise channels (e.g. 201, 203 as in FIG. 3) which may be influenced by the coherence information 404. The noise channels 201, 203 generated by the CNG 220 (220*a*-220) may therefore be modified by a signal modifier 250 controlled by the control noise data (comfort noise parameter data 401, 403, 2312) which indicate signal energies for the first audio channel $L_{out}$ and the second audio channel $R_{out}$.

The audio encoder 300 (300*a*, 300*b*) may include a coherence calculator 320, which may obtain the coherence information (404) to be encoded in the bitstream (e.g. signal 232, frame 241 or 243). The coherence information (c, 404) may indicate a coherence situation between the first channel 301 (e.g. left channel) and the second channel 303 (e.g. right channel) in the inactive frame 308. Examples thereof will be discussed later.

The encoder 300 (300*a*, 300*b*) may include an output interface 310 configured for generating the multi-channel audio signal 232 (bitstream) with the encoded audio data for the active frame 306 and, for the inactive frame 308, the first parametric data (comfort noise parametric data) 401 (p_noise,left) the second parametric noise data (p_noise, right 403) and the coherence data c (404). The first parametric data 401 may be parametric data of the first channel (e.g. left channel) or a first linear combination of the first and second channel (e.g. mid channel). The second parametric data 403 may be parametric data of the second channel (e.g. right channel) or a second linear combination of the first and second channel (e.g. side channel) different from the first linear combination.

In the bitstream 232, there may also be side information 402, including an indication for whether the current frame is an active frame 306 or an inactive frame 308, e.g. to inform the decoder of the decoding techniques to be used.

Figure 5:
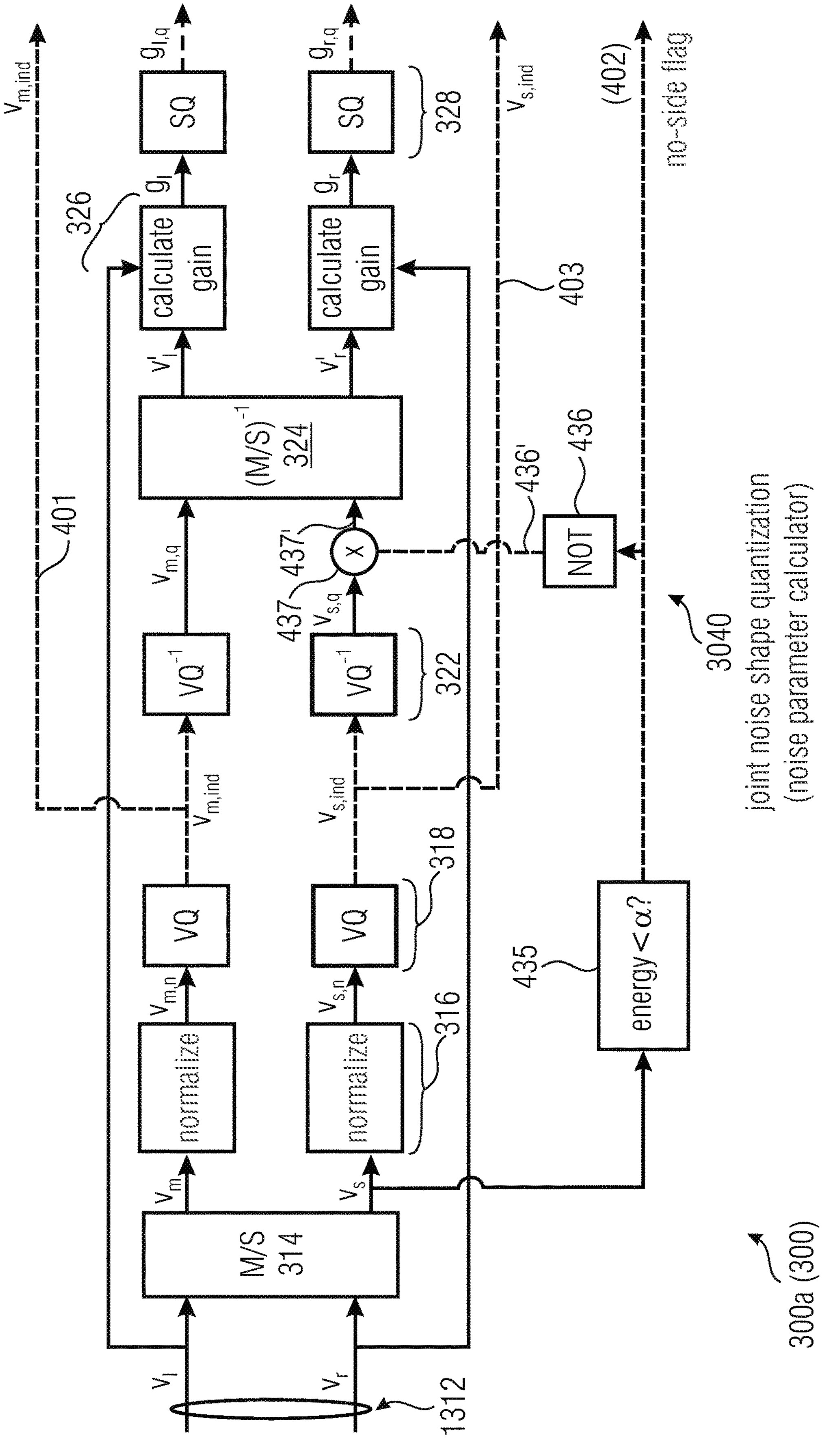
FIG. 5 shows an example of a Noise Parameter Quantization Stage.

In particular, FIG. 4 shows the noise parameter calculator (compute noise parameter stage) 3040 as including a first noise parameter calculator stage 304-1 in which the comfort noise parameter data 401 for the first channel 301 may be computed, and a second noise parameter calculator stage 304-3, in which the second comfort noise parameter 403 for the second channel 303 may be computed. FIG. 2 shows an example where the noise parameters are processed and quantized jointly. Internal parts (e.g. conversion of the noise shape vectors into M/S representation) are shown in FIG. 5. Basically, we may have a noise shape of the first channel M and a noise shape of the second channel S which may be encoded as mid indices and side indices, while a gain for the noise shape of the left channel 301 and gains for the noise shape of the right channel 303 may also be encoded.

A coherence calculator 320 may calculate the coherence data (coherence information) c (404) which indicates the coherence situation between the first channel L and the second channel R. In this case, the coherence calculator 320 may operate in the frequency domain.

As can be seen, the coherence calculator 320 may include a compute channel coherence stage 320' in which coherence value c (404) is obtained. Downstream thereto, a uniform quantizer stage 320" may be used. Hence, it may be obtained a quantized version $c_{ind}$ of the coherence value c.

Here below, there are some explanations on how to obtain the coherence and how to quantize it.

The coherence calculator 320 may, in some examples:

- calculate a real intermediate value and an imaginary intermediate value from complex spectral values for the first channel and the second channel (303) in the inactive frame;
- calculate a first energy value for the first channel and a second energy value for the second channel (303) in the inactive frame; and
- calculate the coherence data (404, c) using the real intermediate value, the imaginary intermediate value, the first energy value and the second energy value, and/or
- smooth at least one of the real intermediate value, the imaginary intermediate value, the first energy value and the second energy value, and to calculate the coherence data using at least one smoothed value.

The coherence calculator 320 may square a smoothed real intermediate value and to square a smoothed imaginary intermediate value and to add the squared values to obtain a first component number. The coherence calculator 320 may multiply the smoothed first and second energy values to obtain a second component number, and combine the first and the second component numbers to obtain a result number for the coherence value, on which the coherence data is based. The coherence calculator 320 may calculate a square root of the result number to obtain a coherence value on which the coherence data is based. Examples of formulas are provided below.

It is now explained how the shape of the noise shape (or other signal energy) to be rendered at the decoder is obtained. What will be encoded is basically the shape (or other information relating to the energy) of the noise of the original input signal 302, which at the decoder will be applied to generated noise 203 and will shape it, so as to render a noise 252 (output audio signal) which resembles the original noise of the signal 304.

At first, it is noted that the signal 304 as such is not encoded in the bitstream 232 by the encoder. However, noise information (e.g., energy information, envelope information) may be encoded in the bitstream 232, so as to subsequently generate a noise signal which has the noise shape encoded by the encoder.

A get noise shape block 312 may be applied to the input signal 304 of the encoder. The "get noise shape" block 312 may calculate a low-resolution parametrical representation 1312 of the spectral envelope of the noise in the input signal 304. This can be done, for example, by calculating energy values in frequency bands of the frequency domain representation of the input signal 304. The energy values may be converted into a logarithmic representation (if necessary) and may be condensed into a lower number (N) of parameters that are later used in the decoder to generate the comfort noise. These low-resolution representations of the noise are here referred to as "noise shapes" 1312. Therefore, what is downstream to the "get noise shape" block 312 is not to be understood as representing the input signal 304, but as representing its noise shape (parametric representations of the noise's spectral envelopes in the respective channels). This is important, since the encoder may only transmit this lower-resolution representation of the noise's spectral envelope in the SID frame. So, in FIG. 2, all of the "Noise parameter calculator" part (3040) may be understood as operating only on these noise-related parameters vectors (e.g. identified as $v_l$, $v_r$, $v_{m,ind}$ and $v_{s,ind}$) and not on signal representations of the signal 304.

FIG. 5 shows an example of the "Noise parameter calculator" part 3040 (joint noise shape quantization). An L/R-to-M/S converter stage 314 may be applied to obtain the mid channel representation $v_m$ of the noise shape 1312 (first linear combination of the noise shapes of channels L and R) and the side channel representation $v_r$ of the noise shape 1312 (second linear combination of the noise shapes of the noise shapes of the channels L and R). Below, there will be shown a way for how to obtain it. Accordingly, the noise shape 304 may result to be divided onto two channels $v_m$ and $v_r$.

Subsequently, at normalization stage 316, at least one of the mid channel representation $v_m$ of the noise shape 1312 and the side channel representation $v_r$ of the noise shape 1312 may be normalized, to obtain a normalized version $v_{m,n}$ of the mid channel representation $v_m$ of the noise shape 1312 and/or a normalized version $v_{r,n}$ of the side channel representation $v_r$ of the noise shape 1312.

Subsequently, a quantization stage (e.g. vector quantization, VQ) 318 may be applied to the normalized version of the signal 1304, e.g. in the form of a quantized version $v_{m,ind}$ of the normalized mid channel representation $v_{m,n}$ of the noise shape 1312 and a quantized version $v_{s,ind}$ of the normalized side channel representation $v_{s,n}$ of the noise shape 1312. A vector quantization (e.g., through a multi-stage vector quantizer) may be used. Hence, indices $v_{m,ind}[k]$ (k being the index of the particular frequency bin) may describe the mid representation of the noise shape and the indices $v_{s,ind}[k]$ may describe the side representation of the noise shape. The indices $v_{m,ind}[k]$ and $v_{s,ind}[k]$ may therefore be encoded in the bitstream 232 as a first linear combination of comfort noise parameter data for the first channel and comfort noise parameter data for the second channel and a second linear combination of comfort noise parameter data for the first channel and comfort noise parameter data for the second channel.

At dequantization stage 322, a dequantization may be performed on the quantized version $v_{m,ind}$ of the normalized mid channel representation $v_{m,n}$ of the noise shape 1312 and the quantized version $v_{s,ind}$ of the normalized side channel representation $v_{s,n}$ of the noise shape 1312

An M/S-to-UR converter 324 may be applied to the dequantized versions of the dequantized mid and side representations $v_{m,q}$ and $v_{s,q}$ of the noise shape 1312, to obtain a version of the noise shape 1312 in the original (left and right) channels $v'_l$ and $v'_r$.

Subsequently, at stage 326, gains $g_l$ and $g_r$ may be calculated. Notably, the gains are valid for all the samples of the noise shape of the same channel ($v'_l$ and $v'_r$) of the same inactive frame 306. The gains $g_l$ and $g_r$ may be obtained by taking into consideration the totality (or almost the totality) of the frequency bins in the noise shape representations $v'_l$ and $v'_r$.

The gain $g_l$ may be obtained by comparing:

- the values of the frequency bins of the noise shape of the first channel 301 in the L/R domain (upstream to the L/R-to-M/S converter 314); with
- the values of the frequency bins of the noise shape 1312, once re-converted in the L/R domain, of the first channel 301 (downstream to the M/S-to-L/R converter 324).

Analogously, the gain $g_r$ may be obtained by comparing:

- the values of the coefficients of the noise shape of the second channel 303 in the L/R domain (upstream to the L/R-to-M/S converter 314); with
- the values of the coefficients of the noise shape 1312, re-converted in the L/R domain, of the second channel 303 (downstream to the M/S-to-L/R converter 324).

An example of how to obtain the gains is proposed below. However, the gain may be, in the linear domain, for example, proportional to a geometrical average of a multiplicity of fractions, each fraction being a fraction between the coefficients of noise shape of a particular channel in the L/R domain (upstream to the L/R-to-M/S converter 314) and the coefficients of the same channel once reconverted in the L/R domain downstream to the M/S-to-L/R converter 324. In the logarithmic domain, for each channel the gain may be obtained as being proportional to an algebraic average between the differences between the coefficients the coefficients of the FD version of the noise shape in the L/R domain (upstream to the L/R-to-M/S converter 314) and the coefficients of the noise shape once reconverted in the L/R domain downstream to the M/S-to-L/R converter 324. In general, in logarithmic or scalar domain, the gain may provide a relationship between a version of the noise shape of the left or right channel before L/R-to-M/S conversion and quantization with a version of the noise shape of the left or right channel after dequantization and M/S-to-L/R reconversion.

A quantization stage 328 may be applied to the gain $g_l$ to obtain a quantized version thereof indicated with $g_{l,q}$, to the gain $g_r$ to obtain a quantized version thereof indicated with $g_{r,q}$ which may be obtained from the non-quantized gain $g_r$. The gains $g_{l,q}$ and $g_{r,q}$ may be encoded in the bitstream 232 (e.g. as comfort noise parameter data 401 and/or 403) to be read by the decoder.

In some examples, it is also possible to compare the energy of the side channel noise shape vector (e.g., before being normalized, e.g., between stages 314 and 316) with a predetermined energy threshold α (which may be a positive real value) (which in this case is 0.1, but could also be a different value, such as a value between 0.05 and 0.15). At a comparison block 435 it is possible to determine whether the side representation $v_s$ of the noise shape of the inactive frame 308 has enough energy. If the energy of the side representation $v_s$ of the noise shape is less than the energy threshold α, then a binary results ("no-side flag"), as side information 402 is signalled in the bitstream 232. It is here imagined that no-side flag=1 if the energy of the side representation $v_s$ of the noise shape is less than the energy threshold α, and no-side flag=0 if the energy of the side representation $v_s$ of the noise shape is larger than the energy threshold α. In some cases, the flag may be 1 or 0 according the particular application in case the energy is exactly equal to the energy threshold. Block 436 negates the binary value of the no-side flag 436 (if the input of block 436 is 1, then the output 436' is 0; if the input of block 436 is 0, then the output 436' is 1). Block 436 is shown as providing as output 436' the opposite value of the flag. Accordingly, if the energy of the side representation $v_s$ of the noise shape is greater than the energy threshold, then the value 436' may be 1, and if the energy of the side representation $v_s$ of the noise shape is less than the predetermined threshold, then the value 436' is 0. It is noted that the dequantized value $v_{s,q}$ may be multiplied by the binary value 436'. This is simply one possible way for obtaining that, if the energy of the side representation $v_s$ of the noise shape is less than the predetermined energy threshold α, then the bins of the dequantized side representation $v_{s,q}$ of the noise shape are artificially zeroed (the output 437' of the block 437 would be 0). On the other side, if the energy of the side representation $v_s$ of the noise shape is sufficiently large (>α), then the output 437' of the block 437 (multiplier) may be exactly the same as $v_{s,q}$. Accordingly, if the energy of the side representation $v_s$ of the noise shape is less than the predetermined energy threshold α, the side representation $v_s$ of the noise shape (and in particular its dequantized version $v_{s,q}$) is not taken into consideration obtaining the left/right representations of the noise shape. (It will be shown that in addition or alternative also the decoder may have a similar mechanism which zeroes the coefficients of the side representation of the noise shape). It is noted that the no-side flag may also be encoded in the bitstream 232 as part of the side information 402.

It is to be noted that the energy of the side representation of the noise shape is shown as being measured (by block 435) before normalization of the noise shape (at block 316), and the energy is not normalized before comparing it to the threshold. It may, in principle, also be measured by block 435 after normalizing the noise shape (e.g., the block 435 could be input by the $v_{s,n}$ instead of $v_s$).

With reference to the threshold α used for comparing the energy of the side representation of the noise shape, the value 0.1 can be, in some examples, arbitrarily chosen. In examples, the threshold α may be chosen after experimentation and tuning (e.g. through calibration). In some examples, in principle any number could be used which works for the number format (floating point or fix point) or precision of an individual implementation. Therefore, the threshold α may be an implementation-specific parameter which may be input after a calibration.

It is noted that the output interface (310) may be configured:

- to generate the encoded multi-channel audio signal (232) having encoded audio data for the active frame (306) using a first plurality of coefficients for a first number of frequency bins; and
- to generate the first parametric noise data, the second parametric noise data, or the first linear combination of the first parametric noise data and the second parametric noise data and second linear combination of the first parametric noise data and the second parametric noise data using a second plurality of coefficients describing a second number of frequency bins,
- wherein the first number of frequency bins is greater than the second number of frequency bins.

In fact, a reduced resolution may be used for the inactive frames, hence further reducing the amount of bits used for encoding the bitstream. The same applies to the decoder.

Any of the examples of the encoder may be controlled by a suitable controller.

Decoder

Now, decoders according to examples are discussed. A decoder may include, for example, a comfort noise generator 220 (220*a*-220*e*) discussed above, e.g. shown in FIGS. 3*a*-3*f*. The comfort noise 204 (multi-channel audio signal) may be shaped at a signal modifier 250, to obtain the output signal 252. We are here interested in showing the operations for generating the noise in the inactive frames 308, and not those for the active frames 206.

FIG. 4 shows a first example of decoder 200', here indicated with 200' (200*b*). It is noted that the decoder 200' includes a comfort noise generator 220 which may include a generator 220 (220*a*-220*e*) according to any of FIGS. 3*a*-3*f*. Downstream to the generator 220 (220*a*-220*e*), a signal modifier 250 (not shown, but shown in FIG. 4) may be present, to shape the generated multi-channel noise 204 according to energy parameters encoded in comfort noise parameter data (401, 403). Through the decoder input interface 210, the decoder 200' may obtain from the bitstream 232 the comfort noise parameter data (401, 403), which may include comfort noise parameter data describing the energy of the signal (e.g., for a first channel and a second channel, or for a first linear combination and second linear combination of the first and second channels, the first and second linear combinations being linearly independent from each other). Through the decoder input interface 210, the decoder 200' may obtain coherence data 404, which indicate the coherence between different channels. FIG. 4 is shown that in the bitstream 232, for the encoding of the inactive frames, there are provided two different silence descriptor frames 241 and 243, respectively, but there is the possibility for using more than two descriptor frames, or only one single descriptor frame. The output of the decoder 200*b* is a multi-channel output With reference to FIG. 2, it is now discussed a decoder 200' (here called indicated with 200*a*) which is an example of the decoder 200, which can be used for generating the output signal 252, e.g. in form of noise.

At first, the decoder 200*a* (200') may include an input interface 210 for receiving the encoded audio data 232 (bitstream) in the sequence of frames 306, 308, as encoded by the encoder 300*a* or 300*b*, for example. The decoder 200*a* (200') may be, or more in general be part of, a multi-channel signal generator 200 which may be or include the comfort noise generator 220 (220*a*-220*e*) of any of FIGS. 3*a*-3*f*, for example.

At first, FIG. 2 shows a stereo, comfort noise generator (CNG) 220 (220*a*-220*e*). In particular, the comfort noise generator 220 (220*a*-220*e*) may be like that of FIGS. 3*a*-3*f* or one of its variants. Here, a coherence information 404 (e.g., c, or more precisely $c_q$ also indicated with "coh" or $c_{ind}$), as obtained from the encoder 300*a* or 300*b* may be used for generating the multi-channel signal 204 (in the channels 201, 203) which have been discussed before. The multi-channel signal 204 as generated by the CNG 220 (220*a*-220*e*) may be actually further modified, e.g. by taking into account the comfort noise parameter data 401 and 403, e.g. noise shape information for a first (left) channel and a second (right) channel of the multi-channel signal to be shaped. In particular it will be shown that there is the possibility for obtaining the mid indices $v_{m,\,ind}$ (401) and the side indices $v_{s,\,ind}$ (403) generated by the encoder 300*a* (and in particular by the noise parameter calculator 3040) at stage 316 and/or 318, and the gains $g_{l,q}$ and $g_{r,q}$ obtained at stage 326 and/or 328.

As shown in FIG. 2, the side information 402 may permit to determine whether the current frame is an active frame 306 or an inactive frame 308. The elements of FIG. 2 refer to the processing of the inactive frames 308, and it is intended that any technique may be used for the generation of the output signal in the active frames 306, which are therefore not an object of the present document.

As shown in FIG. 2, several examples of comfort noise data are obtained from the bitstream 232. The comfort noise data may include, as explained above, coherence information (data) 404, parameters 401 and 403 ($v_{m,\,ind}$ and $v_{s,\,ind}$) indicating noise shape, and/or gains and $g_{r,q}$)

Stage 212-C may dequantize the quantized version $c_{ind}$ of the coherence information 404, to obtain the dequantized coherence information $c_q$.

Figure 6:
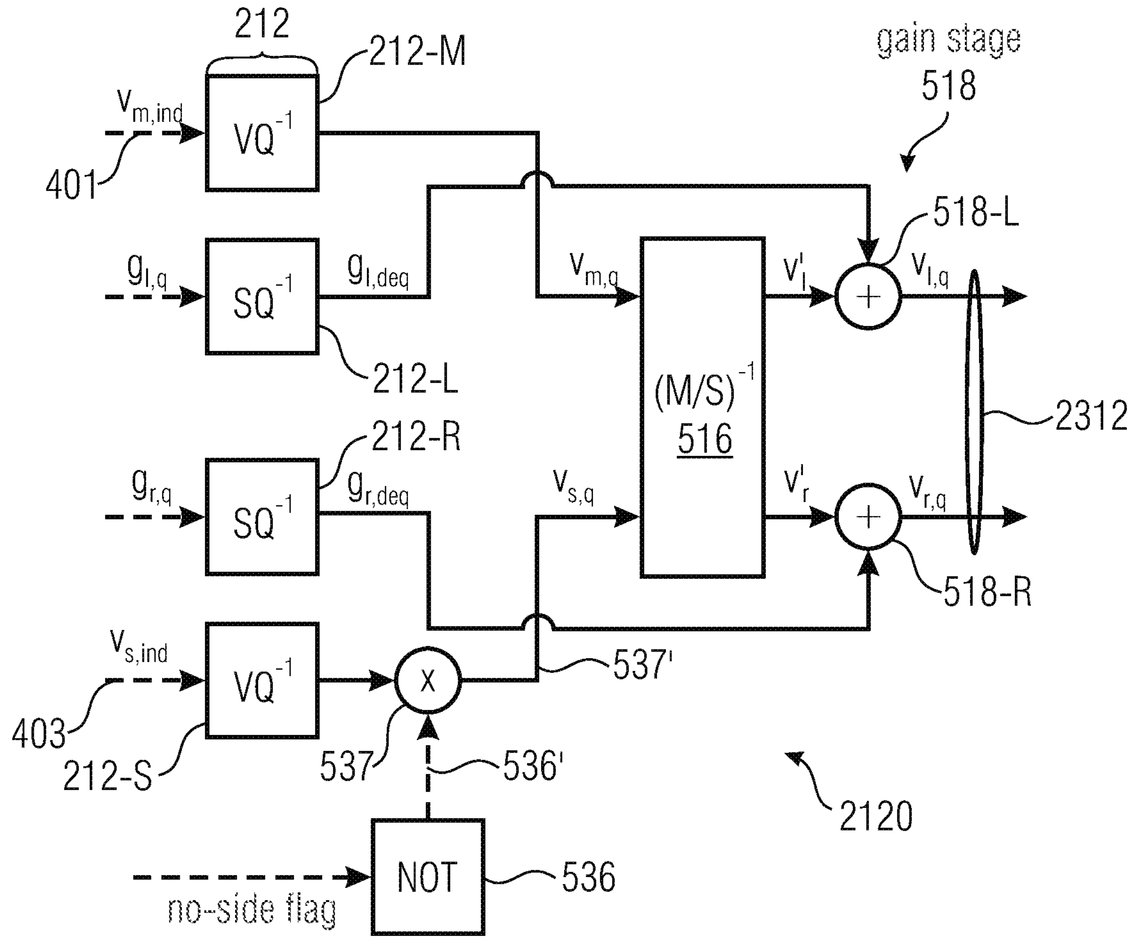
FIG. 6 shows an example of a Noise Parameter De-Quantization Stage.

Stage 2120 (joint noise shape dequantization) may permit to dequantize the other comfort noise data obtained from the bitstream 232. Reference can be made to FIG. 6. A dequantization stage 212 is formed by other dequantization stages here indicated with 212-M, 212-S, 212-R, 212-L. Stage 212-M may dequantize the mid channel noise shape parameters 401 and 403, to obtain the dequantized noise shape parameters $v_{m,q}$ and $v_{s,q}$. The stage 212-S may provide the dequantized version $v_{s,\ q}$ of the side channel noise shape parameters 403 ($v_{s,\ ind}$). In some examples it is possible to make use of the no-side flag, so as to zero the output of stage 212-S in case the energy of the noise shape vector $v_s$ is recognized, by block 435 at the encoder 300*a*, as being less than the predetermined threshold α. In case the energy is less than the predetermined threshold α and the no-side flag signals it, the dequantized version $v_{s,q}$ of the noise shape vector $v_s$ may be zeroed (which conceptually is shown as a multiplication by a flag 536' obtained from a block 536 which has the same function of encoder's block 436, even though block 536 actually reads a no-side flag encoded in the side information of the bitstream 232, without performing any comparison with the threshold α). Therefore, if the energy of side channel at the encoder has been determined as being less than the predetermined threshold α, the dequantized version $v_{s,q}$ of the noise shape vector $v_s$ is artificially zeroed and the value at the output 537' of the scaler block 537 is zero. Otherwise, if the energy is greater than the predetermined threshold, then the output 537' is the same of the quantized version $v_{s,\ q}$ of the side indices 403 ($v_{s,\ ind}$) of the noise shape of the side channel. In other terms, the values of the noise shape vector $v_{s,\ ind}$ are neglected in case of energy of the side channel being below the predetermined energy threshold α.

At M/S-to-L/R stage 516, an M/S-to-L/R conversion is performed, so as to obtain an L/R version $v'_l$, $v'_r$ of the parametric data (noise shape). Subsequently, a gain stage 518 (formed by stages 518-L and 518-L) may be used, so that at stage 518-L the channel $v'_l$ is scaled by the gain $g_{l,d}$, while at stage 518-R, the channel $v'_r$ is scaled by the gain $g_{r,q}$. Therefore, the energy channels $v_{l,\ q}$ and $v_{r,\ q}$ may be obtained as output of the gain stage 518. The stages block 518-L and 518-R are shown with the "+" because the transmission of the values is imagined to be in the logarithmic domain, and the scaling of values is therefore indicated in addition. However, the gain stage 518 indicates that the reconstructed noise shape vectors $v_{l,\ q}$ and $v_{r,\ q}$ are scaled. The reconstructed noise shape vectors $v_{l,\ q}$ and $v_{r,\ q}$ are here complexively indicated with 2312 and are the reconstructed version of the noise shape 1312 as originally obtained by the "get noise shape" block 312 at the encoder. In general terms, each gain is constant for all the indices (coefficients) of the same channel of the same inactive frame.

It is noted that the indices $v_{m,ind}$, $v_{s,ind}$ and gains $g_{l,q}$, $g_{r,q}$ are coefficients of noise shape and give information on the energy of the frame. They basically refer to parametric data associated to the input signal 304 which are used to generate the signal 252, but they do not represent the signal 304 or the signal 252 to be generated. Said another way, the noise channels $v_{r,\ q}$ and $v_{l,\ q}$ describe an envelope to be applied to the multi-channel signal 204 generated by the CNG 220.

Back to FIG. 2, the reconstructed noise shape vectors $v_{l,\ q}$ and $v_{r,\ q}$ (2312) are used at the signal modifier 250, to obtain a modified signal 252 by shaping the noise 204. In particular, the first channel 201 of the generated noise 204 may be shaped by the channel $v_{l,\ q}$ at stage 250-L, and the channel 203 of the generated noise 204 at stage 250-R to obtain the output multi-channel audio signal 252 ($L_{out}$ and $R_{out}$).

In examples, the comfort noise signal 204 itself is not generated in the logarithmic domain: only the noise shapes may use a logarithmic representation. A conversion from the logarithmic domain to the linear domain may be performed (although not shown).

Also a conversion from frequency domain to time domain may be performed (although not shown).

The decoder 200' (200*a*, 200*b*) may also comprise a spectrum-time converter (e.g. the signal modifier 250) for converting the resulting first channel 201 and the resulting second channel 203 being spectrally adjusted and coherence-adjusted, into corresponding time domain representations to be combined with or concatenated to time domain representations of corresponding channels of the decoded multi-channel signal for the active frame. This conversion of the generated comfort noise into a time-domain signal happens after the signal modifier block 250 in FIG. 2. The "combination with or concatenation to" part basically means that before or after an inactive frame which employs one of these CNG techniques, there can also be active frames (other processing path in FIG. 1) and to generate a continuous output without any gaps or audible clicks etc., the frames need to be correctly concatenated.

In some examples:

- the encoded audio signal (232) for the active frame (306) has a first plurality of coefficients describing a first number of frequency bins; and
- the encoded audio signal (232) for the inactive frame (308) has a second plurality of coefficients describing a second number of frequency bins.

The first number of frequency bins may be greater than the second number of frequency bins.

Any of the examples of the decoder may be controlled by a suitable controller.

Processing Steps: A First Version

The noise parameters coded in the two SID frames for the two channels are computed as in EVS [6] such as LP-CNG or FD-CNG or both. Shaping of the Noise energy in the decoder is also the same as in EVS, such as LP-CNG or FD-CNG or both.

In the encoder, additionally the coherence of the two channels is computed, uniformly quantized using four bits and sent in the bitstream 232. In the decoder, the CNG operation may then be controlled by the transmitted coherence value 404. Three Gaussian noise sources $N_1$, $N_2$, $N_3$ (211*a*, 212*a*, 213*a*; 211*b*, 212*b*, 213*b*; 211*c*, 212*c*, 213*c*; 211*d*, 212*d*, 213*d*; 211*e*, 212*e*, 213*e*) may be used as shown FIGS. 3*a*-3*f*. When the channel coherence is high, mainly correlated noise may be added to both channels 221' and 223', while more uncorrelated noise is added if the coherence 404 is low.

For all inactive frames 306, parameters for comfort noise generation (Noise Parameters) may be constantly estimated in the encoder (e.g. 300, 300*a*, 300*b*). This may be done, for example, by applying the Frequency-domain noise estimation algorithm (e.g. [8]) e.g. as described in [6] separately on both input channels (e.g. 301, 303) to compute two sets of Noise Parameters (e.g. 401, 403), which are also explained as parametric noise data. Additionally, the coherence (c, 404) of the two channels may be computed (e.g. at the coherence calculator 320) as follows: Given the M-point DFT-Spectra of the two input channels $L,R \in \mathbb{C}^M$(L,R may be 301, 303) four intermediate values may be computed, e.g.

$$c_{real} = \sum_{i=0}^{M-1} \Re\{L_i \times R_i^*\}$$

$$c_{imag} = \sum_{i=1}^{M-1} \Im\{L_i \times R_i^*\}$$

and the energies of the two channels $$e_L = \langle L, L \rangle \sum_{i=0}^{M-1} L_i \times L_i^*$$

$$e_R = \langle R, R \rangle \sum_{i=0}^{M-1} R_i \times R_i^*$$

Here, it may be M=256, $\Re\{\bullet\}$ denotes the real part of a complex number, $\Im\{\bullet\}$ denotes the imaginary part of a complex number and $\{\bullet\}^*$ denotes complex conjugation. These intermediate values may then be smoothed e.g. using the corresponding values from the previous frame:

$$\overline{c_{real}} = 0.95 \times \overline{c_{real}}_{previous} + 0.05 \times c_{real}$$

$$\overline{c_{imag}} = 0.95 \times \overline{c_{imag}}_{previous} + 0.05 \times c_{imag}$$

$$\overline{e_L} = 0.95 \times \overline{e_L}_{previous} + 0.05 \times e_L$$

$$\overline{e_R} = 0.95 \times \overline{e_R}_{previous} + 0.05 \times e_R$$

This passage may be part of the "Compute Channel Coherence" block 320' at the encoder. This is a temporal smoothing of internal parameters, to avoid large sudden jumps in the parameters between frames. In other terms, a lowpass filter is applied here to the parameters.

Instead of the constants 0.95 and 0.05, other constants within the interval 0.95±0.03 and 0.05±0.03 may be used.

In alternative, it is possible to define:

$$\overline{c_{real}} = \beta \times \overline{c_{real}}_{previous} + \gamma \times c_{real}$$

$$\overline{c_{imag}} = \beta \times \overline{c_{imag}}_{previous} + \gamma \times c_{imag}$$

$$\overline{e_L} = \beta \times \overline{e_L}_{previous} + \gamma \times e_L$$

$$\overline{e_R} = \beta \times \overline{e_R}_{previous} + \gamma \times e_R$$

Where $\beta, \gamma \in [0,1]$ and $\beta+\gamma=1$, for example $\beta=0.95$ and $\gamma=0.05$.

The coherence (c, 404) ((which may be between 0 and 1) may then be calculated (e.g. at the coherence calculator (320) as $$c = \sqrt{\frac{\overline{c}_{real}^2 + \overline{c}_{imag}^2}{\overline{e}_L \times \overline{e}_R}} \approx \sqrt{\frac{|L^* \times R|}{\langle L, L \rangle \times \langle R, R \rangle}}$$

and uniformly quantized (e.g. at the quantizer 320") using e.g. four bits as $$c_{ind}=0,\min(15,\mathrm{floor}(15\times c+0.5))$$

Encoding of the estimated noise parameters 1312, 2312 for both channels may be done separately, e.g. as specified in [6]. Two SID frames 241, 243 may then be encoded and sent to the decoder. The first SID frame 241 may contain the estimated noise parameters 401 of channel L and (e.g. four) bits of side information 402, e.g. as described in [6]. In the second SID frame 243, the noise parameters 403 of channel R may be sent along with the four-bit-quantized coherence value c, 404 (different amounts of bits may be chosen in different examples).

In the decoder (e.g. 200', 200*a*, 200*b*), both SID frame's noise parameters (401, 403) and the first frame's side information 402 may be decoded, e.g. as described in [6]. The coherence value 404 in the second frame may be dequantized in stage 212-C as $$\hat{c}=15\times c_{ind}$$

(in FIG. 2, ĉ is substituted by $c_q$).

For comfort noise generation (e.g., at generator 220 or any of generators 220*a*-220*e*, which may include one of any of FIGS. 3*a*-3*e*), according to an example three Gaussian noise sources 211, 212, 213 may be used as shown in FIG. 3. The noise sources 211, 212, 213 may be adaptively summed together (e.g. at adder stages 206-1 and 206-3) e.g. based on the coherence value (c, 404). The DFT-spectra of the left and right channel noise signals $N_l[k]$,$N_r[k]$ may be computed as $$N_l[k]=\sqrt{1-\hat{c}}\times(N_1[k]+j\times N_1[k+M])+\sqrt{\hat{c}}\times(N_2[k]+j\times N_2[k+M])$$

$$N_r[k]=\sqrt{1-\hat{c}}\times(N_3[k]=j\times N_3[k+M])+\sqrt{\hat{c}}\times(N_2[k]+j\times N_2[k+M])$$

with $k\in\{0, 1, \ldots, M-1\}$ (which is the index of the particular frequency bin, while each channel has M frequency bins) and $j^2=-1$ (i.e. j is the imaginary unit), and "x" is the normal multiplication. Here, "frequency bin" refers to the number of complex values in the spectra $N_l$ and $N_1$, respectively. M is the transform length of the FFT or DFT that is used, so the length of the spectra is M. It is noted that the noise inserted in the real part and the noise inserted in the imaginary part may be different. So for a spectrum length of M, we need 2×M values (one real and one imaginary) generated from each noise source. Or in other words: $N_l$ and $N_r$ are complex-valued vectors of length M, while N1, N2 and N3 are real-valued vectors of length 2×M.

Afterwards, the noise signal 204 in the two channels are spectrally shaped (e.g. within stages 250-L, 250-R in FIG. 2) using their corresponding noise parameters (2312) decoded from the respective SID frame and subsequently transformed back to the time domain (e.g. as described in [6]) for the frequency-domain comfort noise generation.

Any of the examples of the processing may be performed by a suitable controller.

Processing Steps: A Second Version

Aspects of the processing steps as discussed above may be integrated with at least one of the aspects below. It is here mainly referred to FIGS. 2 and 5, but it could also be referred to FIG. 4.

A block diagram of the generic framework of the encoder is depicted in FIG. 1. For each frame at the encoder, the current signal may be classified as either active or inactive by running a VAD on each channel separately as described in [6]. The VAD decision may then be synchronized between the two channels. In examples, a frame is classified as an inactive frame 308 only if both channels are classified as inactive. Otherwise, it is classified as active and both channels are jointly coded in an MDCT-based system using band-wise M/S as described in [10]. When switching from an active frame to an inactive frame, the signals may enter the SID encoding path as shown in FIG. 3.

Parameters (e.g. 1312, 401, 403, $q_{l,q}$, $g_{r,q}$) for comfort noise generation (e.g. Noise Parameters) may be constantly estimated in the encoder (e.g. 300, 300*a*, 300*b*) for both active and inactive frames (306, 308). This may be done, e.g., by applying a Frequency-domain noise estimation process like the one discussed in [8] and/or as described in [6], e.g. separately on both input channels 301, 303 to compute two sets of Noise Parameters, including spectral noise shapes ($M_i$ 401 and/or $I_s$ or 403), e.g. in logarithmic domain for each channel.

Additionally, the coherence (404, c) of the two channels may be computed (e.g. in the coherence calculator 320) as follows: Given the M-point DFT-Spectra of the two input channels $L,R\in\mathbb{C}^M$, four intermediate values may be computed, being $$c_{real}=\sum_{i=1}^{M}\Re\{L_i\times R_i^*\}$$

$$c_{imag}=\sum_{i=1}^{M}\Im\{L_i\times R_i^*\}$$

and the energies of the two channels $$e_L=\langle L,L\rangle\sum_{i=1}^{M}L_i\times L_i^*$$

$$e_R=\langle R,R\rangle\sum_{i=1}^{M}R_i\times R_i^*$$

Here, it may be M=256 (other values for M may be used), $\Re\{\bullet\}$ denotes the real part of a complex number, $\Im\{\bullet\}$ denotes the imaginary part of a complex number and $\{\bullet\}^*$ denotes complex conjugation. These intermediate values are then smoothed on a 10 ms-subframe basis. With $\{\bullet\}_{previous}$ denoting the corresponding value from the previous subframe, the smoothed values may be computed as:

$$\overline{c_{real}}=0.95\times\overline{c_{real}}_{previous}+0.05\times c_{real}$$

$$\overline{c_{imag}}=0.95\times\overline{c_{imag}}_{previous}+0.05\times c_{imag}$$

$$\overline{e_L}=0.95\times\overline{e_L}_{previous}+0.05\times e_L$$

$$\overline{e_R}=0.95\times\overline{e_R}_{previous}+0.05\times e_R$$

Instead of the constants 0.95 and 0.05, other constants within the interval 0.95±0.03 and 0.05∓0.03 may be used.

in alternative, it is possible to define:

$$\overline{c_{real}}=\beta\times\overline{c_{real}}_{previous}+\gamma\times c_{real}$$

$$\overline{c_{imag}}=\beta\times\overline{c_{imag}}_{previous}+\gamma\times c_{imag}$$

$$\overline{e_L}=\beta\times\overline{e_L}_{previous}+\gamma\times e_L$$

$$\overline{e_R}=\beta\times\overline{e_R}_{previous}+\gamma\times e_R$$

Where β, γ∈[0,1] and β+γ=1, for example β=0.95 and γ=0.05 (β>γ, e.g. β>3×γ, or β>6×γ).

The coherence c∈[0, 1] may then be calculated (e.g. at 320') as $$c=\sqrt{\frac{\overline{c}_{real}^2+\overline{c}_{imag}^2}{\overline{e}_L\times\overline{e}_R}}\approx\sqrt{\frac{|L^*\times R|}{\langle L,L\rangle\times\langle R,R\rangle}}$$

and uniformly quantized (e.g. at 320") using four bits (but different amounts of bits are possible) as $$c_{ind}=\min(15,\lfloor 15\times c+0.5\rfloor)\in[0,15],$$

where ⌊•⌋ denotes rounding down to the nearest integer (floor function).

The encoding of the estimated noise shapes of both channels can be done jointly. From the left ($v_l$) and right ($v_r$) channel noise shapes, different channels may be obtained (e.g., through linear combination), such as a mid channel ($v_m$) noise shape and a side channel ($v_s$) noise shape may be computed, (e.g. at block 314) as $$v_m=\left\{\frac{v_{l,1}+v_{r,1}}{2},\ldots,\frac{v_{l,N}+v_{r,N}}{2}\right\},$$

$$v_s=\left\{\frac{v_{l,1}-v_{r,1}}{2},\ldots,\frac{v_{l,N}-v_{r,N}}{2}\right\},$$

where N denotes the length of the noise shape vectors (e.g. for each inactive frame 308), e.g. in the frequency domain. N denotes the length of the noise shape vector e.g. as estimated as in EVS [6], which can be between 17 and 24. The noise shape vectors can be seen as a more compact representation of the spectral envelope of the noise in an input frame. Or, more abstractly, a parametric spectral description of the noise signal using N parameters. N is not related to the transform length of an FFT or a DFT.

These noise shapes may then be normalized (e.g. at stage 316) and/or quantized. For example, they may be vector-quantized (e.g. at stage 318), e.g. using Multi-Stage Vector Quantizers (MSVQ) (an example is described in [6, p 442]).

The MSVQ used at stage 318 to quantize the $v_m$ shape (to obtain $v_{m,\ ind}$ 401) may have 6 stages (but another number of stages is possible) and/or use 37 bits (but another amount of bits is possible), e.g. as implemented for mono channels in [6], while the MSVQ used, at stage 318, to quantize the $v_s$ shape (to obtain $v_{s,\ ind}$ 403) may have been reduced to 4 stages (or in any case a number of stages less than the number of stages used at stage 318) and/or may use in total 25 bits (or in any case an amount of bits less than the amount of bits used at stage 318 for coding the shape $v_m$).

Codebook indices of the MSVQs may be transmitted in the bitstream (e.g. in the data 232, and more in particularly in the comfort noise parameter data 401, 403). The indices are then dequantized resulting in the dequantized noise shapes $v_{m,\ q}$ and $v_{m,\ q}$.

In the case of the background noise being a single noise source in the center of the stereo image, the estimated noise shapes of both channels $v_m$, $v_s$ are expected to be very similar or even equal. The resulting S channel noise shape will then contain only zeros. However, the vector quantizer (stage 322) used to quantize $v_s$ current implementation may be such that it cannot model an all-zero vector and after dequantization, the dequantized $v_s$ noise shape ($v_{s,\ q}$) could result to not be all-zero anymore. This can lead to perceptual problems with representing such centered background noises. To circumvent this shortcoming of the VQ 322, a no_side value (no_side flag) may be computed (and may also be signalled in the bitstream) depending on the energy of the unquantized $v_s$ shape vector (e.g., the energy of the $v_s$ noise shape vector after stage 314 and/or before stage 316). The no_side flag may be:

$$\text{no\_side} = \begin{cases} 1, \text{ if } \sum_{j=1}^{N} v_{s,j}^2 \leq \alpha \\ 0, \text{ otherwise} \end{cases}$$

The energy threshold α could be, just to give an example, 0.1 or another value in the interval [0.05, 0.15]. However, the threshold α may be arbitrary and in an implementation may be dependent on the number format used (e.g. fix point or floating point) and/or on possibly used signal normalizations. In examples, a positive real value could be used, depending on how harsh the employed definition of a "silent" S channel is. Therefore, the interval may be (0, 1). no_side value may be used to indicate whether an $v_s$ noise shape should be used for reconstructing the $v_l$ and $v_r$ channel noise shapes (e.g. at the decoder). If no_side is 1, the dequantized $v_s$ shape is set to zero (e.g. by scaling the channel $v_{s,q}$ by the value of 436' in FIG. 2, which is a logical value NOT(no_side)). no_side is transmitted (signalled) in the bitstream 232, e.g. as side information 402. Subsequently, inverse M/S-transform (e.g. stage 324) may be applied to the dequantized noise shape vectors $v_{m,q}$ and $v_{s,q}$ (the latter being substituted, for example, by 0 in case the energy is low, hence indicated with 437' in FIG. 2), to get the intermediate vectors $v'_l$ and $v'_r$ as:

$$v'_l = \left\{\frac{v_{m,q,1} + v_{m,q,1}}{2}, \ldots, \frac{v_{m,q,N} + v_{s,q,N}}{2}\right\}$$

$$v'_r = \left\{\frac{v_{m,q,1} - v_{s,q,1}}{2}, \ldots, \frac{v_{m,q,N} - v_{s,q,N}}{2}\right\}$$

Using these intermediate vectors $v'_l$ and $v'_r$ and the unquantized noise shape vectors $v_l$ and $v_r$, two gain values are computed as $$g_{l,q} = \frac{\sum_{i=1}^{N} v_{l,i} - \sum_{i=1}^{N} v'_{l,i}}{N}$$

$$g_{r,q} = \frac{\sum_{i=1}^{N} v_{r,i} - \sum_{i=1}^{N} v'_{l,i}}{N}.$$

The two gain values may then be linearly quantized (e.g. at stage 328) as $$g_{x,q} = \min(\max([g_x \times 1.5 + 45], 0), 127) \in [0, 127].$$

other quantizations are possible).

The quantized gains may be encoded in the SID bitstream (e.g. as part of the comfort noise parameter data 401 or 403, and more in particular $g_{l,q}$ may be part of the first parametric noise data, and $g_{r,q}$ may be part of the second parametric noise data), e.g. using seven bits for the gain value $g_{l,q}$ and/or seven bits for the gain value $g_{r,q}$ (different amounts are also possible for each gain value).

In the decoder (e.g. 200', 200*a*, 200*b*), the quantized noise shape vectors (e.g., part of the comfort noise parameter data 401 or 403, and more in particular of the first parametric noise data and the second parametric noise data) may be dequantized, e.g. at stage 212 (in particular, in any of substages 212-M, 212-S).

The gain values may be dequantized, e.g. at stage 212 (in particular, in any of substages 212-L, 212-R) as $$g_{l,deq} = \frac{(g_{l,q} - 45)}{1.5}$$

$$g_{r,deq} = \frac{(g_{r,q} - 45)}{1.5}$$

(the value 45 depends on the quantization, and may be different with different quantizations). (In FIG. 2, $g_{l,d}$ and $g_{r,d}$ are used instead of $g_{l,deq}$ and $g_{r,deq}$).

The coherence value 404 may be dequantized (e.g. at stage 212-C) as $$c_q = 15 \times c_{ind}.$$

If no_side flag (in the side information 402) is 1, the dequantized $v_s$ shape $v_{s,q}$ is set to zero (value 537') before calculating the intermediate vectors $v'_l$ and $v'_r$ (e.g. at stage 516). The corresponding gain value is then added to all elements of the corresponding intermediate vector to generate the dequantized noise shapes $v_{l,q}$ and $v_{l,q}$ complexively indicated with 522) as $$v_{l,q} = \{v'_{l,1} + g_{L,deq}, \ldots, v'_{l,N} + g_{L,deq}\}$$

$$v_{r,q} = \{v'_{r,1} + g_{L,deq}, \ldots, v'_{r,N} + g_{R,deq}\}.$$

(The addition is because we are in the logarithmic domain and corresponds to a multiplication with a factor in the linear domain.)

For comfort noise generation, three gaussian noise sources $N_1$, $N_2$, $N_3$ (e.g. 211*a*, 212*a*, 213*a* in FIG. 3*a*, 211*b*, 212*b*, 212*c* in FIG. 3*b*, etc.) may be used as shown in any of FIGS. 3*a*-3*f* (or any of the other techniques may be used). When the channel coherence is high, mainly correlated noise is added to both channels, while more uncorrelated noise is added if the coherence is low.

Using the three noise sources, DFT-spectra of the left and right channel noise signals $N_l$ (201) and $N_r$ (203) may be computed as $$N_l[k] = \sqrt{1-c_q} \times (N_1[k] + j \times N_1[k+M]) + \sqrt{c_q} \times (N_2[k] + j \times N_2[k+M])$$

$$N_r[k] = \sqrt{1-c_q} \times (N_3[k] + j \times N_3[k+M]) + \sqrt{c_q} \times (N_2[k] + j \times N_2[k+M])$$

with $k \in \{0, 1, \ldots, M-1\}$ and $j^2 = -1$. Here, M denotes the blocklength of the DFT. To generate independent noise in both the real and the imaginary part of the complex spectrum, 2×M values (two for one frequency bin) per frame have to be generated by each noise source. Therefore, $N_1$, $N_2$ and $N_3$ (at respectively 211, 212, 213 in FIG. 3*f*) can be seen as real-valued noise vectors having a length of 2×M while $N_r$ and $N_k$ (respectively at 201, 203) are complex-valued vectors of length M.

Afterwards, the noise signals in the two channels may be spectrally shaped (e.g. at the signal modifier 252) using their corresponding noise shape ($v_{l,q}$ or $v_{r,q}$) decoded from the bitstream 232 and subsequently transformed back from the logarithmic domain to the scalar domain, and from the frequency domain to the time domain, e.g. as described in [6] to generate a stereophonic comfort noise signal.

Any of the examples of the processing may be performed by a suitable controller.

Some Advantages

The present invention may provide a technique for stereo comfort noise generation especially suitable for discrete stereo coding schemes. By jointly coding and transmitting noise shape parameters for both channels, stereo CNG can be applied without the need for a mono downmix.

Together with the two individual sets of noise parameters, the mixing of one common and two individual noise sources controlled by a single coherence value allows for faithful reconstruction of the background noise's stereo image without needing to transmit fine-grained stereo parameters which are typically only present in parametric audio coders. Since only this one parameter is employed, encoding of the SID is straightforward without the need for sophisticated compression methods while still keeping the SID frame size low.

SOME IMPORTANT ASPECTS

In some examples, at least one of the following aspects is obtained:

1. Generate comfort noise for stereophonic signal by mixing three gaussian noise sources, one for each channel and the third common noise source to create correlated background noise.
2. Control the mixing of the noise sources with the coherence value that is transmitted with the SID frame.
3. Transmit individual noise shape parameters for both stereo channels by jointly coding the noise shapes in an M/S fashion. Lower SID frame bitrate by coding S shape with fewer bits than M.

Other Techniques

- it is also possible to implement a method of generating a multi-channel signal having a first channel and a second channel, comprising:
  - generating a first audio signal using a first audio source;
  - generating a second audio signal using a second audio source;
  - generating a mixing noise signal using a mixing noise source; and
  - mixing the mixing noise signal and the first audio signal to obtain the first channel and mixing the mixing noise signal and the second audio signal to obtain the second channel.
- It is also possible to implement a method of audio encoding for generating an encoded multi-channel audio signal for a sequence of frames comprising an active frame and an inactive frame, the method comprising:
  - analyzing a multi-channel signal to determine a frame of the sequence of frames to be an inactive frame;
  - calculating first parametric noise data for a first channel of the multi-channel signal and calculating second parametric noise data for a second channel of the multi-channel signal;
  - calculating coherence data indicating a coherence situation between the first channel and the second channel in the inactive frame; and
  - generating the encoded multi-channel audio signal having encoded audio data for the active frame and, for the inactive frame, the first parametric noise data, the second parametric noise data, and the coherence data.

The invention may also be implemented in a non-transitory storage unit storing instructions which, when executed by a computer (or processor, or controller) cause the computer (or processor, or controller) to perform the method above.

The invention may also be implemented in a multi-channel audio signal organized in a sequence of frames, the sequence of frames comprising an active frame and an inactive frame, the encoded multi-channel audio signal comprising:

- encoded audio data for the active frame;
- first parametric noise data for a first channel in the inactive frame;
- second parametric noise data for a second channel in the inactive frame; and
- coherence data indicating a coherence situation between the first channel and the second channel in the inactive frame. The multi-channel audio signal may be obtained with one of the techniques disclosed above and/or below.

Advantages of Embodiments

The insertion of a common noise source for the two channels to imitate the correlated noise for generating the final comfort noise plays an important role on imitating stereophonic background noise recording.

Embodiments of the invention can also be considered as a procedure to generate comfort noise for stereophonic signal by mixing three Gaussian noise sources, one for each channel and the third common noise source to create correlated background noise, or additionally or separately, to control the mixing of the noise sources with the coherence value that is transmitted with the SID frame, or additionally or separately, as follows: In a stereo system, generating the background noise separately leads to completely uncorrelated noise which sounds unpleasant and is very different from the actual background noise causing abrupt audible transitions when we switch to/from active mode background to DTX mode backgrounds. In an embodiment, at the encoder side, additionally to the noise parameters the coherence of the two channels is computed, uniformly quantized and added to the SID frame. In the decoder, the CNG operation is then controlled by the transmitted coherence value. Three Gaussian noise sources N_1, N_2, N_3 are used; when the channel coherence is high, mainly correlated noise is added to both channels, while more uncorrelated noise is added if the coherence is low.

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

An inventively encoded signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

BIBLIOGRAPHY OR REFERENCES

[1] *ITU-T G. 729 Annex B A silence compression scheme for G. 729 optimized for terminals conforming to ITU-T Recommendation V.70. International Telecommunication Union (ITU) Series G,* 2007.

[2] *ITU-T G.729.1 Annex C DTX/CNG scheme. International Telecommunication Union (ITU) Series G,* 2008.

[3] *ITU-T G. 718 Frame error robust narrow-band and wideband embedded variable bit-rate coding of speech and audio from* 8-32 *kbit/s. International Telecommunication Union (ITU) Series G,* 2008.

[4] *Mandatory Speech Codec speech processing functions; Adaptive Multi-Rate (AMR) speech codec; Transcoding functions,* 3GPP Technical Specification TS 26.090, 2014.

[5] *Adaptive Multi-Rate-Wideband (AMR-WB) speech codec; Transcoding functions,* 3GPP, 2014.

[6] 3*GPP TS* 26.445, *Codec for Enhanced Voice Services (EVS); Detailed algorithmic description.*

[7] Z. Wang and e. al, "Linear prediction based comfort noise generation in the EVS codec," in *IEEE International Conference on Acoustics, Speech and Signal Processing (ICASSP)*, Brisbane, Q L D, 2015.

[8] A. Lombard, S. Wilde, E. Ravelli, S. Döhla, G. Fuchs and M. Dietz, "Frequency-domain Comfort Noise Generation for Discontinuous Transmission in EVS," in *IEEE International Conference on Acoustics, Speech and Signal Processing (ICASSP)*, Brisbane, Q L D, 2015.

[9] A. Lombard, M. Dietz, S. Wilde, E. Ravelli, P. Setiawan and M. Multrus, "Generation of a comfort noise with high spectro-temporal resolution in discontinuous transmission of audio signals". U.S. Pat. No. 9,583,114B2, 19 Jun. 2015.

[10] E. NORVELL and F. JANSSON, "SUPPORT FOR GENERATION OF COMFORT NOISE. AND GENERATION OF COMFORT NOISE". WO Patent WO 2019/193149 A1, 5 Apr. 2019.

The invention claimed is:

1. A multi-channel signal generator for generating a multi-channel signal comprising a first channel and a second channel, comprising:

a first audio source for generating a first audio signal;

a second audio source for generating a second audio signal;

a mixing noise source for generating a mixing noise signal; and a mixer for mixing the mixing noise signal and the first audio signal to acquire the first channel and for mixing the mixing noise signal and the second audio signal to acquire the second channel, wherein the mixer comprises:

a first amplitude element for influencing an amplitude of the first audio signal;

a first adder for adding an output signal of the first amplitude element and at least a portion of the mixing noise signal;

a second amplitude element for influencing an amplitude of the second audio signal;

a second adder for adding an output of the second amplitude element and at least a portion of the mixing noise signal, wherein an amount of influencing performed by the first amplitude element and an amount of influencing performed by the second amplitude element are equal to each other or the amount of influencing performed by the second amplitude element is different by less than 20 percent of the amount performed by the first amplitude element, wherein the mixer comprises a third amplitude element for influencing an amplitude of the mixing noise signal, wherein an amount of influencing performed by the third amplitude element depends on the amount of influencing performed by the first amplitude element or the second amplitude element, so that the amount of influencing performed by the third amplitude element becomes greater when the amount of influencing performed by the first amplitude element or the amount of influencing performed by the second amplitude element becomes smaller.

2. The channel signal generator as claimed in claim 1, wherein the first audio source is a first noise source and the first audio signal is a first noise signal, and/or the second audio source is a second noise source and the second audio signal is a second noise signal, wherein the first noise source and/or the second noise source is configured to generate the first noise signal and/or the second noise signal so that the first noise signal and/or the second noise signal is decorrelated from the mixing noise signal.

3. The multi-channel signal generator as claimed in claim 1, wherein the mixer is configured to generate the first channel and the second channel so that an amount of the mixing noise signal in the first channel is equal to an amount of the mixing noise signal in the second channel or is within a range of 80 percent to 120 percent of the amount of the mixing noise signal in the second channel.

4. The multi-channel signal generator as claimed in claim 1, wherein the mixer comprises a control input for receiving a control parameter, and wherein the mixer is configured to control an amount of the mixing noise signal in the first channel and the second channel in response to the control parameter.

5. The multi-channel signal generator as claimed in claim 1, wherein each of the first audio source, the second audio source and the mixing noise source is a Gaussian noise source.

6. The multi-channel signal generator as claimed in claim 1, wherein the first audio source comprises a first noise generator to generate the first audio signal as a first noise signal, wherein the second audio source comprises a decorrelator for decorrelating the first noise signal to generate the second audio signal as a second noise signal, and wherein the mixing noise source comprises a second noise generator.

7. The multi-channel signal generator as claimed in claim 1, wherein the first audio source comprises a first noise generator to generate the first audio signal as a first noise signal, wherein the second audio source comprises a second noise generator to generate the second audio signal as a second noise signal, and wherein the mixing noise source comprises a decorrelator for decorrelating the first noise signal or the second noise signal to generate the mixing noise signal.

8. The multi-channel signal generator as claimed in claim 1, wherein one of the first audio source, the second audio source and the mixing noise source comprises a noise generator to generate a noise signal, and wherein another one of the first audio source, the second audio source and the mixing noise source comprises a first decorrelator for decorrelating the noise signal, and wherein a further one of the first audio source, the second audio source and the mixing noise source comprises a second decorrelator for decorrelating the noise signal, wherein the first decorrelator and the second decorrelator are different from each other so that output signals of the first decorrelator and the second decorrelator are decorrelated from each other.

9. The multi-channel signal generator as claimed in claim 1, wherein the first audio source comprises a first noise generator, wherein the second audio source comprises a second noise generator, and wherein the mixing noise source comprises a third noise generator, wherein the first noise generator, the second noise generator and the third noise generator are configured to generate mutually decorrelated noise signals.

10. The multi-channel signal generator as claimed in claim 1, wherein one of the first audio source, the second audio source and the mixing noise source comprises a pseudo random number sequence generator configured for generating a pseudo random number sequence in response to a seed, and wherein at least two of the first audio source, the second audio source and the mixing noise source are configured to initialize the pseudo random number sequence generator using different seeds.

11. The multi-channel signal generator as claimed in claim 1, wherein at least one of the first audio source, the second audio source and the mixing noise source is configured to operate using a pre-stored noise table.

12. The multi-channel signal generator as claimed in claim 11, wherein at least one noise generator is configured to generate a complex noise spectral value for a frequency bin k using for one of the real part and the imaginary part, a first random value at an index k and using, for the other one of the real part and the imaginary part, a second random value at an index (k+M), wherein the first noise value and the second noise value are included in a noise array, e.g. derived from a random number sequence generator or a noise table or a noise process, ranging from a start index to an end index, the start index being lower than M, and the end index being equal to or lower than 2M, wherein M and k are integer numbers.

13. The multi-channel signal generator as claimed in claim 1, wherein at least one of the first audio source, the second audio source and the mixing noise source is configured to generate a complex spectrum for a frame using a first noise value for a real part and a second noise value for an imaginary part.

14. The multi-channel signal generator as claimed in claim 1, wherein the amount of influencing performed by the third amplitude element is the square root of a predetermined value and an amount of influencing performed by the first amplitude element and an amount of influencing performed by the second amplitude element is the square root of the difference between 1 and the predetermined value.

15. The multi-channel signal generator as claimed in claim 1, further comprising:

an input interface for receiving encoded audio data in a sequence of frames comprising an active frame and an inactive frame following the active frame; and an audio decoder for decoding coded audio data for the active frame to generate a decoded multi-channel signal for the active frame, wherein the first audio source, the second audio source, the mixing noise source and the mixer are active in the inactive frame to generate the multi-channel signal for the inactive frame.

16. The multi-channel signal generator as claimed in claim 15, wherein:

the encoded audio data for the active frame comprises a first plurality of coefficients describing a first number of frequency bins; and the encoded audio data for the inactive frame comprises a second plurality of coefficients describing a second number of frequency bins, wherein the first number of frequency bins is greater than the second number of frequency bins.

17. The multi-channel signal generator as claimed in claim 15, wherein the audio data for the inactive frame comprises:

a first silence insertion descriptor frame for the first channel and a second silence insertion descriptor frame for the second channel, wherein the first silence insertion descriptor frame comprises comfort noise parameter data for the first channel, and/or for a first linear combination of the first and second channels, and comfort noise generation side information for the first channel and the second channel, and wherein the second silence insertion descriptor frame comprises comfort noise parameter data for the second channel, and/or for a second linear combination of the first and second channels and coherence information indicating a coherence between the first channel and the second channel in the inactive frame, and wherein the multi-channel signal generator comprises a controller for controlling the generation of the multi-channel signal in the inactive frame using the comfort noise generation side information for the first silence insertion descriptor frame to determine a comfort noise generation mode for the first channel and the second channel, and/or for a first linear combination of the first and second channels and a second linear combination of the first and second channels, using the coherence information in the second silence insertion descriptor frame to set a coherence between the first channel and the second channel in the inactive frame, and using the comfort noise parameter data from the first silence insertion descriptor frame and using the comfort noise parameter data from the second silence insertion descriptor frame for setting an energy situation of the first channel and an energy situation of the second channel.

18. The multi-channel signal generator as claimed in claim 15, wherein the audio data for the inactive frame comprises:

at least one silence insertion descriptor frame for a first linear combination of the first and second channels and a second linear combination of the first and second channels, wherein the at least one silence insertion descriptor frame comprises comfort noise parameter data for the first linear combination of the first and second channels, and comfort noise generation side information for the second linear combination of the first and second channels, wherein the multi-channel signal generator comprises a controller for controlling the generation of the multi-channel signal in the inactive frame using the comfort noise generation side information for the first linear combination of the first and second channels and the second linear combination of the first and second channels, using the coherence information in the second silence insertion descriptor frame to set a coherence between the first channel and the second channel in the inactive frame, and using the comfort noise parameter data from the at least one silence insertion descriptor frame and using the comfort noise parameter data from the at least one silence insertion descriptor frame for setting an energy situation of the first channel and an energy situation of the second channel.

19. The multi-channel signal generator as claimed in claim 15, wherein the audio data for the inactive frame comprises:

a silence insertion descriptor frame, wherein the silence insertion descriptor frame comprises comfort noise parameter data for the first and the second channel and comfort noise generation side information for the first channel and the second channel and/or for a first linear combination of the first and second channels and a second linear combination of the first and second channels, and coherence information indicating a coherence between the first channel and the second channel in the inactive frame, and wherein the multi-channel signal generator comprises a controller for controlling the generation of the multi-channel signal in the inactive frame using the comfort noise generation side information for the silence insertion descriptor frame to determine a comfort noise generation mode for the first channel and the second channel, using the coherence information in the silence insertion descriptor frame to set a coherence between the first channel and the second channel in the inactive frame, and using the comfort noise parameter data from the silence insertion descriptor frame for setting an energy situation of the first channel and an energy situation of the second channel.

20. The multi-channel signal generator as claimed in claim 15, wherein the encoded audio data for the inactive frame comprises silence insertion descriptor data comprising comfort noise data indicating a signal energy for each channel in a mid/side representation and coherence data indicating the coherence between the first channel and the second channel in the left/right representation, wherein the multi-channel signal generator is configured to convert the mid/side representation of the signal energy onto a left/right representation of the signal energy in the first channel and the second channel, wherein the mixer is configured to mix the mixing noise signal to the first audio signal and the second audio signal based on the coherence data to acquire the first channel and the second channel, and wherein the multi-channel signal generator further comprises a signal modifier configured for modifying the first and second channel by shaping the first and second channel based on the signal energy in the left/right domain.

21. The multi-channel signal generator as claimed in claim 20, configured, in case the audio data comprise signalling indicating that the energy in the side channel is smaller than a predetermined threshold, to zero the coefficients of the side channel.

22. The multi-channel signal generator as claimed in claim 20, wherein the audio data for the inactive frame comprises:

at least one silence insertion descriptor frame, wherein the at least one silence insertion descriptor frame comprises comfort noise parameter data for the mid and the side channel and comfort noise generation side information for the mid and the side channel, and coherence information indicating a coherence between the first channel and the second channel in the inactive frame, and wherein the multi-channel signal generator comprises a controller for controlling the generation of the multi-channel signal in the inactive frame using the comfort noise generation side information for the silence insertion descriptor frame to determine a comfort noise generation mode for the first channel and the second channel, using the coherence information in the silence insertion descriptor frame to set a coherence between the first channel and the second channel in the inactive frame, and using the comfort noise parameter data, or a processed version thereof, from the silence insertion descriptor frame for setting an energy situation of the first channel and an energy situation of the second channel.

23. The multi-channel signal generator as claimed in claim 15, further configured to scale signal energy coefficients for the first and second channel by gain information, encoded with the comfort noise parameter data for the first and second channel.

24. The multi-channel signal generator as claimed in claim 1, configured to convert the generated multi-channel signal from a frequency domain version to a time domain version.

25. The multi-channel signal generator as claimed in claim 1, wherein the first audio source is a first noise source and the first audio signal is a first noise signal, or the second audio source is a second noise source and the second audio signal is a second noise signal, wherein the first noise source or the second noise source is configured to generate the first noise signal or the second noise signal so that the first noise signal or the second noise signal are at least partially correlated, and wherein the mixing noise source is configured for generating the mixing noise signal with a first mixing noise portion and a second mixing noise portion, the second mixing noise portion being at least partially decorrelated from the first mixing noise portion; and wherein the mixer is configured for mixing the first mixing noise portion of the mixing noise signal and the first audio signal to acquire the first channel and for mixing the second mixing noise portion of the mixing noise signal and the second audio signal to acquire the second channel.

26. A method of generating a multi-channel signal comprising a first channel and a second channel, comprising:

generating a first audio signal using a first audio source;

generating a second audio signal using a second audio source;

generating a mixing noise signal using a mixing noise source; and mixing the mixing noise signal and the first audio signal to acquire the first channel and mixing the mixing noise signal and the second audio signal to acquire the second channel, the method comprising:

using a first amplitude element influencing an amplitude of the first audio signal;

using a first adder adding an output signal of the first amplitude element and at least a portion of the mixing noise signal;

using a second amplitude element influencing an amplitude of the second audio signal;

using a second adder adding an output of the second amplitude element and at least a portion of the mixing noise signal, wherein an amount of influencing performed by the first amplitude element and an amount of influencing performed by the second amplitude element are equal to each other or the amount of influencing performed by the second amplitude element is different by less than 20 percent of the amount performed by the first amplitude element, wherein mixing uses a third amplitude element influencing an amplitude of the mixing noise signal, wherein an amount of influencing performed by the third amplitude element depends on the amount of influencing performed by the first amplitude element or the second amplitude element, so that the amount of influencing performed by the third amplitude element becomes greater when the amount of influencing performed by the first amplitude element or the amount of influencing performed by the second amplitude element becomes smaller.

27. A non-transitory digital storage medium having stored thereon a computer program for performing a method of generating a multi-channel signal comprising a first channel and a second channel, comprising:

generating a first audio signal using a first audio source;

generating a second audio signal using a second audio source;

generating a mixing noise signal using a mixing noise source; and mixing the mixing noise signal and the first audio signal to acquire the first channel and mixing the mixing noise signal and the second audio signal to acquire the second channel, the method comprising:

using a first amplitude element influencing an amplitude of the first audio signal;

using a first adder adding an output signal of the first amplitude element and at least a portion of the mixing noise signal;

using a second amplitude element influencing an amplitude of the second audio signal;

using a second adder adding an output of the second amplitude element and at least a portion of the mixing noise signal, wherein an amount of influencing performed by the first amplitude element and an amount of influencing performed by the second amplitude element are equal to each other or the amount of influencing performed by the second amplitude element is different by less than 20 percent of the amount performed by the first amplitude element, wherein mixing uses a third amplitude element influencing an amplitude of the mixing noise signal, wherein an amount of influencing performed by the third amplitude element depends on the amount of influencing performed by the first amplitude element or the second amplitude element, so that the amount of influencing performed by the third amplitude element becomes greater when the amount of influencing performed by the first amplitude element or the amount of influencing performed by the second amplitude element becomes smaller, when said computer program is run by a computer.

* * * * *